(12) United States Patent
Van Meeteren et al.

(10) Patent No.: US 12,367,777 B2
(45) Date of Patent: Jul. 22, 2025

(54) SYSTEMS AND METHODS FOR AUTONOMOUS HAZARDOUS AREA DATA COLLECTION

(71) Applicant: The Travelers Indemnity Company, Hartford, CT (US)

(72) Inventors: Adriaan J. Van Meeteren, East Greenwich, RI (US); Alex A. Shyshkov, Roxbury, CT (US); Ryan W. Bachiochi, Windsor Locks, CT (US); Nichole D. Fratini, Plainville, CT (US); Pawel T. Parobek, South Windsor, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 18/329,571

(22) Filed: Jun. 5, 2023

(65) Prior Publication Data

US 2023/0316930 A1 Oct. 5, 2023

Related U.S. Application Data

(62) Division of application No. 16/870,071, filed on May 8, 2020, now Pat. No. 11,710,411.

(51) Int. Cl.
*G08G 5/26* (2025.01)
*B64U 10/60* (2023.01)
(Continued)

(52) U.S. Cl.
CPC ............. *G08G 5/26* (2025.01); *G05D 1/0022* (2013.01); *G05D 1/0088* (2013.01); *G05D 1/106* (2019.05);
(Continued)

(58) Field of Classification Search
CPC .................................................... G08G 6/0013
See application file for complete search history.

(56) References Cited

U.S. PATENT DOCUMENTS 8,223,009 B2   7/2012   Anderson et al.
8,618,922 B2 * 12/2013  Debouk .............. B60W 50/038
                                                    340/576
(Continued)

FOREIGN PATENT DOCUMENTS

EP    3325228    5/2018
EP    3737141    11/2020
(Continued)

OTHER PUBLICATIONS

Office Action for U.S. Appl. No. 16/870,071 dated Feb. 14, 2022; 47 pps.
(Continued)

*Primary Examiner* — Jean Paul Cass
(74) *Attorney, Agent, or Firm* — Rowan Tree Law Group, PLLC; Carson C.K. Fincham

(57) ABSTRACT

Systems and methods for automatically identifying and ascertaining an estimated amount of damage at a location by utilizing one or more autonomous vehicles, e.g., "drone" devices, to autonomously capture data of the location and utilizing Artificial Intelligence (AI) logic modules to analyze the captured data and construct a 3-D model of the location.

20 Claims, 13 Drawing Sheets

(51) Int. Cl.
  *B64U 101/30* (2023.01)
  *G05D 1/00* (2024.01)
  *G08G 5/55* (2025.01)
  *G08G 5/57* (2025.01)
  *H04W 4/40* (2018.01)

(52) U.S. Cl.
  CPC ............... *G08G 5/55* (2025.01); *G08G 5/57* (2025.01); *H04W 4/40* (2018.02); *B64U 10/60* (2023.01); *B64U 2101/30* (2023.01); *B64U 2201/10* (2023.01); *B64U 2201/202* (2023.01)

(56) References Cited

U.S. PATENT DOCUMENTS

| | | | |
|---|---|---|---|
| 8,838,271 | B2 | 9/2014 | Ghose et al. |
| 8,849,494 | B1 * | 9/2014 | Herbach ............ G05D 1/0044 701/24 |
| 10,011,352 | B1 * | 7/2018 | Dahlstrom ............ B64U 10/60 |
| 10,137,984 | B1 | 11/2018 | Flick |
| 10,173,773 | B1 | 1/2019 | Flick |
| 10,669,025 | B1 | 6/2020 | Flick |
| 10,677,771 | B2 | 6/2020 | Dittberner et al. |
| 11,537,149 | B2 * | 12/2022 | Sekiyama ............ G08G 5/55 |
| 11,710,411 | B2 * | 7/2023 | Van Meeteren ..... G05D 1/0088 701/120 |
| 2004/0222153 | A1 * | 11/2004 | Baniel ............... B01D 11/0488 210/774 |
| 2007/0262861 | A1 | 11/2007 | Anderson et al. |
| 2011/0241862 | A1 * | 10/2011 | Debouk ............ B60W 60/0018 340/439 |
| 2018/0075417 | A1 * | 3/2018 | Gordon ................ B64D 1/22 |
| 2018/0260793 | A1 | 9/2018 | Li et al. |
| 2020/0167722 | A1 | 5/2020 | Goldberg |
| 2021/0188541 | A1 * | 6/2021 | Kurani ................. B65F 1/14 |
| 2021/0278837 | A1 * | 9/2021 | Fairfield ............. G05D 1/0044 |

FOREIGN PATENT DOCUMENTS

| | | | |
|---|---|---|---|
| EP | 3737141 A1 * | 11/2020 | .......... B64C 39/024 |
| WO | WO 2020132233 | 6/2020 | |

OTHER PUBLICATIONS

Final Office Action for U.S. Appl. No. 16/870,071 dated Aug. 5, 2022; 52 pps.

Office Action for U.S. Appl. No. 16/870,071 dated Sep. 29, 2022; 54 pps.

Notice of Allowance for U.S. Appl. No. 16/870,071 dated Mar. 7, 2023; 41 pps.

Arribas et al. "Coverage Optimization with a Dynamic Network of Drone Relays", IEEE Transactions on Mobile Computing; vol. 19, Issue 10, Oct. 1, 2020; 21 pps.

* cited by examiner

SYSTEMS AND METHODS FOR
AUTONOMOUS HAZARDOUS AREA DATA
COLLECTION

CROSS-REFERENCE TO RELATED
APPLICATIONS

Benefit and priority under 35 U.S.C. § 120 is hereby claimed to, and this is a Divisional of, U.S. patent application Ser. No. 16/870,071 filed on May 8, 2020 and titled "SYSTEMS AND METHODS FOR AUTONOMOUS HAZARDOUS AREA DATA COLLECTION", which issued as U.S. Pat. No. 11,710,411 on Jul. 25, 2023 and which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Identification and analysis of damage at a location, particularly in the case of potentially hazardous conditions at the location, are extremely time consuming, costly, often dangerous, and prone to various errors. The cost of a hazardous material suit, for example, averages to approximately two hundred and fifty dollars ($250) per suit and requires training and adherence to decontamination and disposal protocols. Even properly suited personnel are exposed to a level of risk when entering potentially hazardous areas to conduct analysis or investigation. Hazardous material suits limit dexterity and ability to investigate and are not capable of protecting personnel from unsafe structural conditions, such as in a damaged building that may collapse.

The increased availability and capability of Unmanned Aerial Vehicle (UAV) devices has provided additional options for investigative personnel. UAV devices may be utilized, for example, by remotely piloting the devices into a potentially hazardous area to perform remote investigations. Such remotely operated UAV devices are much more expensive than a hazardous material suit, however, with the most common commercial models typically costing one to two thousand dollars ($1,000-$2,000). As UAV devices are primarily navigated utilizing visual (e.g., First Person Video (FPV)) or Global Positioning System (GPS) controls, they are impeded from operation in closed spaces (e.g., inside of buildings) and/or in low-visibility conditions (e.g., smoke).

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
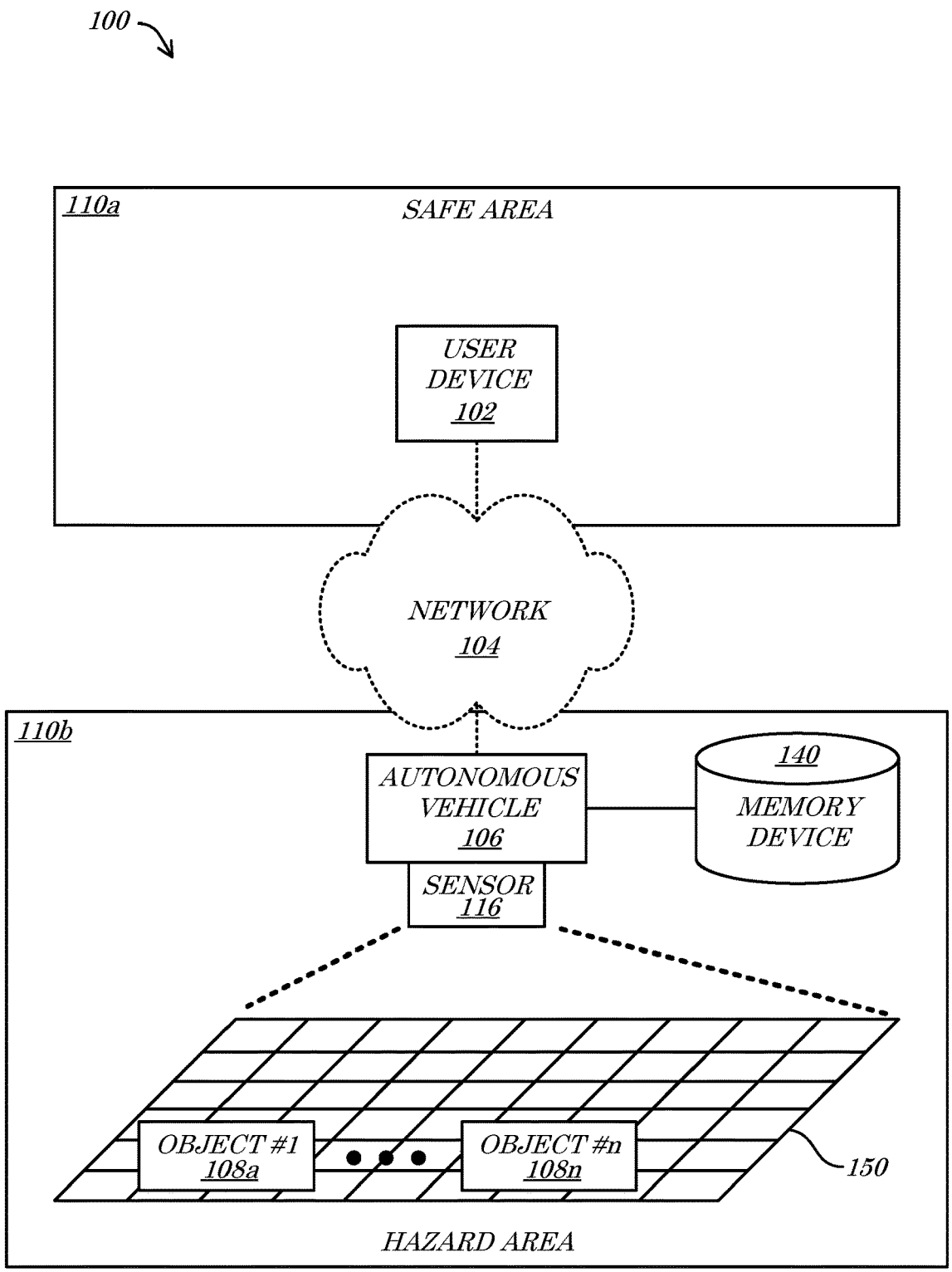
FIG. 1 is a block diagram of a system according to some embodiments.

Damage analysis for objects in potentially hazardous locations is often highly labor intensive, dangerous, and prone to analysis errors. Previous attempts at decreasing the time delay of such analysis have generally concentrated on analysis utilizing Unmanned Aerial Vehicle (UAV) devices in place of personnel in hazardous material ("hazmat") suits. In particular, commercially available UAV devices, such as the DJI™ Phantom 4™ PRO v2.0 available from Da-Jiang Innovations Science and Technology Co., Ltd ("DJI") of Shenzhen, China, may be remotely piloted (e.g., via FPV) around damaged structures or over damaged areas to assess safety levels, estimated repair costs, etc. Such UAV devices are expensive, however, and have limited ability to function in enclosed and/or low-visibility areas. Accordingly, analysis of high-risk areas remains a costly, time consuming, and error-prone process.

In accordance with embodiments herein, these and other deficiencies of previous solutions are remedied by providing systems, apparatus, methods, and articles of manufacture for automatically, quickly, and accurately ascertaining safety levels and/or estimated amounts of damage at a location by utilizing one or more autonomous vehicles to capture data of the location and utilizing Artificial Intelligence (AI) logic modules to analyze the captured data, e.g., to produce a 3-D map or model of the location. In some embodiments, for example, a high-risk location damage analysis system may employ a set of logical rules and/or procedures (such as one or more vehicle navigation and/or AI analysis modules) that are specially-coded to: (i) cause an autonomous vehicle to acquire or capture data at a location (e.g., at a first position and/or at a first time), (ii) analyze (e.g., utilizing an AI module) the data to identify a number (and/or position) of discrete objects or "landmarks" at the location, (iii) cause the autonomous vehicle (and/or a second autonomous vehicle) to move to a new position at the location, (iv) cause the autonomous vehicle to capture additional data from the second position, (v) analyze (e.g., utilizing the AI module) the data to identify a number (and/or position) of discrete objects or "landmarks" at the location (e.g., additional or original), (vi) analyze (e.g., utilizing the AI module) the data to generate a 3-D map or model of the location; (vii) navigate the autonomous vehicle to a position within data transmission range of a base station, (ix) drop-off and/or collect one or more data sample objects at the location, (x) analyze the data to identify damage (or lack thereof) at the location, (xi) calculate an estimated damage and/or repair amount for the location, (xii) output a total estimated dollar amount of damage for the location, and/or (xiii) calculate an insurance claim result based on the total estimated dollar amount of damage for the location and stored insurance policy parameters.

According to some embodiments, one or more drones may be deployed to autonomously explore and map an enclosed area, such as an area inside of a damaged building, and may be programmed to navigate to a position within range of a base station to transmit captured data to the base station. In some embodiments, such drones may be constructed as inexpensive alternatives to hazmat suits and expensive commercial drones. The drones may, for example, lack GPS and/or remote-control capabilities and instead may be autonomously navigated utilizing on-board stored procedures, reducing the overall cost of the drones.

II. Autonomous Hazardous Area Data Collection Systems

Referring first to FIG. 1, a block diagram of a system 100 according to some embodiments is shown. In some embodiments, the system 100 may comprise a user device 102 communicatively coupled, e.g., via a network 104 (and/or one or more direct communication paths), to a drone or autonomous vehicle 106 (e.g., a UAV and/or other autonomous vehicle). In some embodiments, the autonomous vehicle 106 may be positioned or disposed to capture data descriptive of a plurality of discrete objects 108*a-n*. As depicted in FIG. 1, for example, the user device 102 may be disposed in a "safe area" 110*a* and the autonomous vehicle 106 may be positioned or disposed in a "hazard area" 110*b*. According to some embodiments, the safe area 110*a* may comprise an area outside of and/or adjacent to the hazard area 110*b* (and/or an area deemed to be safe) and/or the hazard area 110*b* may comprise an area that contains contamination, damage, unsafe conditions, etc. The hazard area 110*b* may comprise, for example, a site of a toxic chemical spill or leak, a site containing hazardous obstacles and/or conditions (such as downed power lines, contaminated water, dangerous animals, explosives, or area containing a lava flow), and/or an area inside of a potentially unsafe structure, such as in a damaged building, a cave, or a mine. In some embodiments, the autonomous vehicle 106 may comprise a sensor 116 disposed and/or oriented to capture and/or measure data descriptive of the hazard area 110*b*. The sensor 116 may be coupled to the autonomous vehicle 106, for example, and/or may send and/or receive signals that cause an identification and/or locating of one or more of the discrete objects 108*a-n*.

In some embodiments, the autonomous vehicle 106 may be in communication with (e.g., via the network 104 and/or directly) a memory device 140 (e.g., storing various logic, instructions, and/or processes, such as one or more AI modules, as described herein). In accordance with various embodiments herein, the user device 102 may be utilized to direct, manage, and/or interface with the autonomous vehicle 106 to capture data of the hazard area 110*b* and the discrete objects 108*a-n* therein. In some embodiments, the captured data may be provided from the autonomous vehicle 106 to the user device 102 (e.g., via the network 104 and/or directly) for inspection and/or analysis. According to some embodiments, the autonomous vehicle 106 may utilize the data to construct a 3-D map or model 150 of the hazard area 110*b* (or a portion thereof), e.g., via execution of stored analysis rules and/or logic (e.g., the AI module(s)). According to some embodiments, the autonomous vehicle 106 may utilize the model 150 to navigate throughout the hazard area 110*b* and collect the data descriptive thereof. The autonomous vehicle 106 may utilize, for example, Visual Simultaneous Location And Mapping (VSLAM) logical procedures to provide for autonomous data gathering and navigation. In some embodiments, the autonomous vehicle 106 may lack GPS and/or remote-piloting capabilities, reducing the cost of the autonomous vehicle 106 compared to other devices. In such a manner, for example, errors and timeliness constraints that hinder current hazardous location analysis procedures may be remedied by employing a low-cost, autonomous vehicle 106 (e.g., that competes with the price-point of a hazmat suit—but lacks the training, personal safety, and disposal constraints thereof).

Fewer or more components 102, 104, 106, 108*a-n*, 110, 116, 140, 150 and/or various configurations of the depicted components 102, 104, 106, 108*a-n*, 110, 116, 140, 150 may be included in the system 100 without deviating from the scope of embodiments described herein. In some embodiments, the components 102, 104, 106, 108*a-n*, 110, 116, 140, 150 may be similar in configuration and/or functionality to similarly named and/or numbered components as described herein. In some embodiments, the system 100 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

The user device 102, in some embodiments, may comprise any type or configuration of computing, mobile electronic, network, user, and/or communication device that is or becomes known or practicable. The user device 102 may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. In some embodiments, the user device 102 may comprise one or more devices owned and/or operated by one or more users, such as a damage analyst, claims investigator, first responder, etc. According to some embodiments, the user device 102 may communicate with the autonomous vehicle 106 via the network 104 (and/or via direct communication links) to initiate an autonomous (or semi-autonomous) data collection routine of the autonomous vehicle 106 to collect data descriptive of the hazard area 110*b* (such as the data utilized to generate the model 150), as described herein. According to some embodiments, the user device 102 may store and/or execute specially programmed instructions (such as a mobile device application) to operate in accordance with embodiments described herein (e.g., to communicate instructions to and/or receive captured/generated data from the autonomous vehicle 106). The user device 102 may, for example, execute one or more mobile device programs that activate and/or initiate the autonomous vehicle 106 and/or that output graphical indications of the model 150 and/or the identification and/or locations of the discrete objects 108*a-n*, e.g., to calculate a total number of discrete objects 108*a-n* in the hazard area 110*b*, to identify types of discrete objects 108*a-n* (e.g., via object classification), to identify damage to the discrete objects 108a-n, and/or to estimate a monetary value of the damage to the discrete objects 108a-n and/or to the hazard area 110b.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the user device 102, the autonomous vehicle 106, and/or the memory device 140. In some embodiments, the network 104 may comprise direct communications links between any or all of the components 102, 106, 116, 140 of the system 100. The user device 102 may, for example, be directly interfaced or connected to one or more of the autonomous vehicle 106 and/or the memory device 140 via one or more wires, cables, wireless links, and/or other network components, such network components (e.g., communication links) comprising portions of the network 104. In some embodiments, the network 104 may comprise one or many other links or network components other than those depicted in FIG. 1. The user device 102 may, for example, be connected to the autonomous vehicle 106 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 106, 116, 140 of the system 100. The network 104 may comprise one or more cellular telephone networks with communication links between the user device 102 and the autonomous vehicle 106, for example, and/or may comprise a BLE, NFC, RF, and/or a "personal" network comprising short-range wireless communications between the user device 102 and the autonomous vehicle 106, for example.

The autonomous vehicle 106, in some embodiments, may comprise any type or configuration of vehicle, device, and/or object that is capable of sensing, capturing, and/or recording data descriptive of the hazard area 110b. The autonomous vehicle 106 may comprise, for example, one or more UAV devices, aircraft, rigid and/or inflatable airships, satellites, spacecraft, payload delivery systems, payload guidance systems, unmanned ground vehicles (UGV), unmanned surface vehicles (USV), including waterborne craft, and unmanned underwater vehicles (UUV). The terms "autonomous vehicle" and "drone" are used interchangeably herein. According to some embodiments, the autonomous vehicle 106 may comprise one or more low-cost drones, such as a drone comprising the memory device 140, the sensor 116, and components not explicitly depicted in FIG. 1, such as a housing, frame, or body, one or more propulsion devices, a power supply (such as a battery), and a processing unit. In some embodiments, the autonomous vehicle 106 may comprise a plurality of cooperative vehicles and/or devices (not separately shown in FIG. 1), such as a first autonomous vehicle 106 tasked with capturing data descriptive of a first portion of the hazard area 110b and a second autonomous vehicle 106 tasked with capturing data descriptive of a second portion of the hazard area 110b. The imagery and/or other data captured by the autonomous vehicle 106 may generally comprise any type, quantity, and/or format of photographic, video, and/or other sensor data descriptive of the hazard area 110b (e.g., relative locations of the discrete objects 108a-n at the hazard area 110b).

According to some embodiments, the discrete objects 108a-n may comprise any number of objects for which identification and/or damage information is desired and/or available. The discrete objects 108a-n may comprise specific targets (or types of targets/objects) designated by the user device 102 and/or may comprise objects or items identified by the autonomous vehicle 106 (e.g., via the sensor 116). In the case of VSLAM navigation of the autonomous vehicle 106, for example, the discrete objects 108a-n may comprise landmarks that are utilized by the autonomous vehicle 106 to construct the model 150 and/or to calculate positioning information for the autonomous vehicle 106. In some embodiments, the discrete objects 108a-n may comprise any objects that may be separately identifiable and/or distinguishable by the autonomous vehicle 106 (and/or an AI module thereof). Examples of the discrete objects 108a-n may include, but are not limited to, people, furniture (e.g., tables, chairs, desks, carpets, rugs, lamps, couches, beds, dressers, nights stands), animals, walls (and/or wall features, such as pictures, paintings, murals, and/or signs), ceilings (and/or ceiling features, such as ceiling fans, lighting fixtures, and/or skylights), floors, corners, doorways and doors, windows, vents, light switches, power receptacles, other fixtures, and/or possible indoor environmental conditions and/or objects such as puddles, floods, running water, smoke, sparks, fire, mold, and/or ice. According to some embodiments, such as in the case that the sensor 116 comprises an Infrared Radiation (IR), thermal, and/or other measurement device, one or more of the discrete objects 108a-n may comprise areas of different temperatures (e.g., "hot spots") and/or readings (e.g., areas of higher or lower readings, such as anomalies).

In some embodiments, the autonomous vehicle 106 (and/or the user device 102) may store and/or execute specially-programmed instructions to operate in accordance with embodiments described herein. The autonomous vehicle 106 may, for example, execute one or more programs, such as VSLAM navigation and/or AI object recognition algorithms that facilitate and/or cause the autonomous detection, verification, data capture, and/or data analysis of the hazard area 110b in response to a damage or loss event, as described herein. According to some embodiments, the user device 102, and/or the autonomous vehicle 106 may be in communication with the memory device 140. The memory device 140 may store, for example, mobile device application data, discrete object data, insurance policy data, damage estimation data, location data (such as coordinates, distances, etc.), security access protocol and/or verification data, and/or instructions that cause various devices (e.g., the user device 102 and/or the autonomous vehicle 106) to operate in accordance with embodiments described herein.

According to some embodiments, the memory device 140 may comprise any type, configuration, and/or quantity of data storage devices that are or become known or practicable. The memory device 140 may, for example, comprise an array of optical and/or solid-state hard drives configured to store object identification data, location data, AI module(s), image analysis data, flight or navigational plan data, and/or damage estimation data provided by (and/or requested by) the user device 102, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, CA). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Either or both of the user device 102 and the autonomous vehicle 106 may comprise the memory device 140 or a portion thereof, for example.

Figure 2:
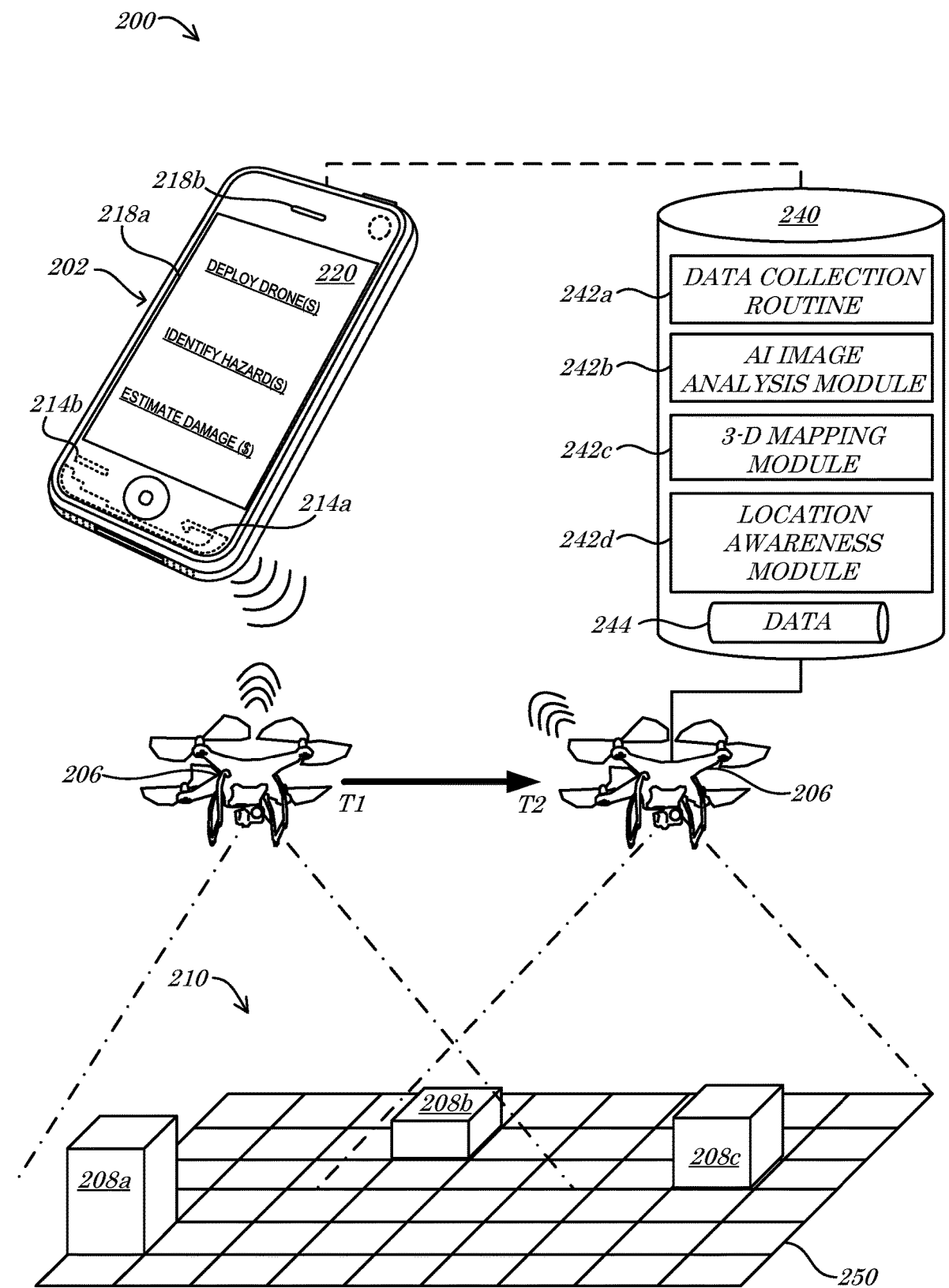
FIG. 2 is a mixed block and perspective diagram of a system according to some embodiments.

Turning to FIG. 2, a mixed block and perspective diagram of system 200 according to some embodiments, is shown. In some embodiments, the system 200 may comprise a mobile electronic device 202 in communication with a drone 206. In some embodiments, the drone 206 may be disposed to capture imagery (and/or other data) descriptive of a location (not separately labeled in FIG. 2; e.g., the hazard area 110*b* of FIG. 1 herein) comprising a plurality of landmarks 208*a-c*. Each landmark 208*a-c* may comprise, for example, various architectural features, obstacles, and/or items disposed in a building (not shown) into which the drone 206 has been sent to autonomously acquire data. According to some embodiments, the mobile electronic device 202 may comprise one or more communication antennas 214*a-b* (e.g., a first antenna 214*a*, such as a cellular network or long-range antenna, and/or a second antenna 214*b*, such as a Wi-Fi®, Bluetooth®, and/or other short-range communications antenna) and/or output devices 218*a-b* (e.g., a first output device 218*a*, such as a display screen, and/or a second output device 218*b*, such as a speaker). According to some embodiments, the mobile electronic device 202 (and/or the display screen 218*a* thereof) may output a Graphical User Interface (GUI) 220 that provides output from and/or accepts input for a mobile device application executed by the mobile electronic device 202.

In some embodiments, the mobile electronic device 202 may execute the mobile device application to conduct communications with the drone 206. The mobile electronic device 202 may, for example, transmit a signal (e.g., utilizing the first antenna 214*a* and/or the second antenna 214*b*) to the drone 206 that causes the drone 206 to initiate an autonomous data collection process. The drone 206 may be deployed and/or initiated by the user device 202, for example, such that it becomes disposed at a first location at a first time "T1", as shown. According to some embodiments, the drone 206 may comprise or be in communication with a memory device 240 that stores various instructions and/or information, such as a data collection routine 242*a*, an AI image analysis module 242*b*, a 3-D mapping module 242*c*, a location awareness module 242*d*, and/or stored data 244. In some embodiments, the drone 206 may (e.g., upon initiation by the user device 202) execute the data collection routine 242*a* to navigate to the first location and utilize one or more sensors (not separately show or labeled in FIG. 2) to acquire data (e.g., stored as the data 244) descriptive of an area surrounding and/or proximate to the first location (e.g., at the first time "T1").

According to some embodiments, the mobile electronic device 202 may direct the drone 206 to initiate the data collection routine 242*a* by providing target coordinates or directions descriptive of the first location (e.g., a mailing address, map-based input, and/or latitude and longitude coordinates) and/or a different positional target (not shown) within operational flight distance of the first location. In response to transmissions from the mobile electronic device 202, for example, the drone 206 may activate one or more propulsion and/or flight control devices (not separately labeled) to move the drone 206 to the first location and/or to a specific position above the first location (e.g., at a first altitude; e.g., based on an execution of the data collection routine 242*a*). In such a manner, for example, the drone 206 may capture imagery and/or acquire other data descriptive of the location from the vantage point of the first position. According to some embodiments, the first data may comprise data descriptive of a first landmark 208*a* and/or a second landmark 208*b*, e.g., within a field of view of the drone 206 while at the first location. In some embodiments, the first data may be descriptive of an identity of the first landmark 208*a* and/or the second landmark 208*b* (e.g., classification, grouping, identification, and/or characterization based on an execution of the AI image analysis module 242*b*; e.g., a rock, a tree, a desk, a human, a propane cylinder, etc.), a location of the first landmark 208*a* and/or the second landmark 208*b* (one or more absolute locations, such as coordinates and/or distances from known locations and/or relative locations, e.g., distances from the drone 206 and/or between the first and second landmarks 208*a-b*), and/or a characteristic of the first landmark 208*a* and/or the second landmark 208*b* (e.g., size, color, shape, machine-readable indicia thereof, etc.).

In some embodiments, the drone 206 may reposition to a second location at a second time "T2". The drone 206 may, for example, execute the data collection routine 242*a* to conduct a navigation to the second location. According to some embodiments, the data collection routine 242*a* may generate and/or define a navigational route and/or process that directs the drone 206 to the second location. In response to output from the data collection routine 242*a*, for example, the drone 206 may activate the one or more propulsion and/or flight control devices to move the drone 206 to the second location and/or to a specific position above the second location (e.g., at a second altitude, which may be different than the first altitude). In some embodiments, the drone 206 may utilize sensor data as input into the data collection routine 242*a* to identify the second location (and/or a route thereto). According to some embodiments, the drone 206 may capture second imagery and/or second data at the second location at the second time "T2". According to some embodiments, the second data may comprise data descriptive of the second landmark 208*b* and/or a third landmark 208*c*, e.g., within a field of view of the drone 206 while at the second location. In some embodiments, the second data may be descriptive of an identity of the second landmark 208*b* and/or the third landmark 208*c* (e.g., classification, grouping, identification, and/or characterization based on an execution of the AI image analysis module 242*b*; e.g., a rock, a tree, a desk, a human, a propane cylinder, etc.), a location of the second landmark 208*b* and/or the third landmark 208*c* (one or more absolute locations, such as coordinates and/or distances from known locations and/or relative locations, e.g., distances from the drone 206 and/or between the second and third landmarks 208*b-c*), and/or a characteristic of the second landmark 208*b* and/or the third landmark 208*c* (e.g., size, color, shape, machine-readable indicia thereof, etc.).

As depicted in the non-limiting example of FIG. 2, the second landmark 208*b* may be common to the first and second data collected at/from each of the first location and the second location. In some embodiments, the data collection routine 242*a* may identify and/or choose the second location, such that at least one landmark 208*a-c*, such as the second landmark 208*b*, may remain in the field of view of the drone 206 when repositioned to the second location. In such a manner, for example, the acquired data may comprise overlap, such that it may be stitched together to develop a contiguous, continuous, and/or connected representation of the analyzed location. The drone 206 may, for example, utilize such data as input into the 3-D mapping module 242*c* to develop a multi-dimensional (e.g., 3-D) model 250 of the analyzed location. The AI image analysis module 242*b* may be utilized in some embodiments to identify the portions of collected data (e.g., stored as the data 244) described in the first and second data that match and/or correspond. According to some embodiments, the drone 206 may utilize the overlapping data descriptive of one or more common landmarks 208*a-c*, such as the second landmark 208*b*, to identify and/or track a location (e.g., a discrete location) of the drone 206. The drone 206 may, for example, execute the location awareness module 242*d* to calculate a current location of the drone 206 at, inside of, and/or proximate to the analyzed hazardous location and/or area. In some embodiments, output from the AI image analysis module 242*b* and/or the 3-D mapping module 242*c* (e.g., the model 250) may be utilized by the location awareness module 242*d* to track, plot, plan, and/or otherwise manage the positioning of the drone 206.

In some embodiments, any or all imagery and/or other data captured, recorded, and/or sensed at, near, and/or otherwise descriptive of the landmarks 208*a-c* thereof (e.g., the first and/or second data), may be transmitted, processed, and/or analyzed. The data may be transmitted from the drone 206 to the mobile electronic device 202, for example, and the mobile device application executed by the mobile electronic device 202 may implement stored rules and/or logic to analyze and/or output the received data. According to some embodiments, a graphical representation of the model 250 may be output via the first output device 218*a* (and/or the GUI 220) of the mobile electronic device 202, based on the model 250 received from the drone 206.

According to some embodiments, the drone 206 (and/or the mobile electronic device 202) may be in communication with and/or may comprise the memory device 240. While the memory device 240 is depicted as being in communication with the drone 206, the memory device 240 may comprise one or more data storage devices and/or objects disposed in and/or accessible by either or both of the drone 206 and the mobile electronic device 202. According to some embodiments, the memory device 240 may store fewer or more modules, procedures, and/or programs than are depicted in FIG. 2. The AI image analysis module 242*b*, for example, may comprise a plurality of AI modules operable to accept input data received from the drone 206, identification and/or location data for the landmarks 208*a-c*, damage identification data, damage cost (e.g., repair/replacement cost) data, and/or insurance data, e.g., that may be acquired from a separate device or source (not shown) and/or may be stored as the data 244 in the memory device 240.

In some embodiments, a program or module stored by the memory device 240 (such as the AI image analysis module 242*b* and/or a portion thereof) may comprise and/or define programming logic that is directed to identifying and/or quantifying damage to the landmarks 208*a-c* and/or to the analyzed location. Such a module may, for example, utilize one or more of the first and second data as input and analyze features within the imagery and/or data (e.g., expected, designed, and/or typical architectural information, as compared to actual architectural information at the location) to identify one or more areas of damage or non-conformity. In some embodiments, the damage information and/or identification may be compared and/or cross-referenced with repair and/or replacement data (e.g., the data 244, or a portion thereof) to calculate an expected monetary amount of damage (e.g., loss) for the analyzed location and/or for any or all of the landmarks 208*a-c*. In such a manner, for example, the drone 206 may (i) identify a number of landmarks 208*a-c* at the location, (ii) identify the types of landmarks 208*a-c* at the location, (iii) identify any visible (and/or otherwise sensed) damage to the location and/or to the landmarks 208*a-c* at the location, and/or (iv) quantify (e.g., estimate a dollar amount) the total amount of damage for the analyzed location.

In some embodiments, the mobile electronic device 202 may comprise a smart mobile phone, such as the iPhone® 8 or a later generation iPhone®, running iOS 10 or a later generation of iOS, supporting Location Services. The iPhone® and iOS are produced by Apple Inc., however, embodiments herein are not limited to any particular portable computing device or smart mobile phone. For example, the mobile electronic device 202 may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable form-factor devices by any vendor containing at least one Central Processing Unit (CPU) and a wireless communication device (e.g., the communication antennas 214*a-b*).

According to some embodiments, the mobile electronic device 202 runs (i.e., executes) the mobile device software application ("app") that causes the generation and/or output of the GUI 220. In some embodiments, the app works with Location Services supported by an iOS operating system executing on the mobile electronic device 202. The app may include, comprise, and/or cause the generation of the GUI 220, which may be utilized, for example, for transmitting and/or exchanging data with the drone 206. In some embodiments, once the app receives captured data from the drone 206, the app may translate the received data, such as the model 250, into a graphical representation of the analyzed location (and/or of the landmarks 208*a-c*).

While a single drone 206 is depicted as being utilized to capture the data descriptive of the analyzed location and the landmarks 208*a-c* thereof in FIG. 2, according to some embodiments, the drone 206 may comprise a plurality of drones or other autonomous vehicles, including, for example, aerial vehicles, surface vehicles (e.g., wheeled, tracked, and/or waterborne vehicles), mobile sensors, and/or other actuatable devices that are or become known or practicable. While the drone 206 is depicted for convenience of illustration, for example, other aerial (and/or spaceborne), ground-engaging, waterborne, and/or other vehicles may be utilized in accordance with some embodiments.

Fewer or more components 202, 206, 208*a-c*, 214*a-b*, 218*a-b*, 220, 240, 242*a-d*, 244 and/or various configurations of the depicted components 202, 206, 208*a-c*, 214*a-b*, 218*a-b*, 220, 240, 242*a-d*, 244 may be included in the system 200 without deviating from the scope of embodiments described herein. In some embodiments, the components 202, 206, 208*a-c*, 214*a-b*, 218*a-b*, 220, 240, 242*a-d*, 244 may be similar in configuration and/or functionality to similarly named and/or numbered components as described herein. In some embodiments, the system 200 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

Figure 3:
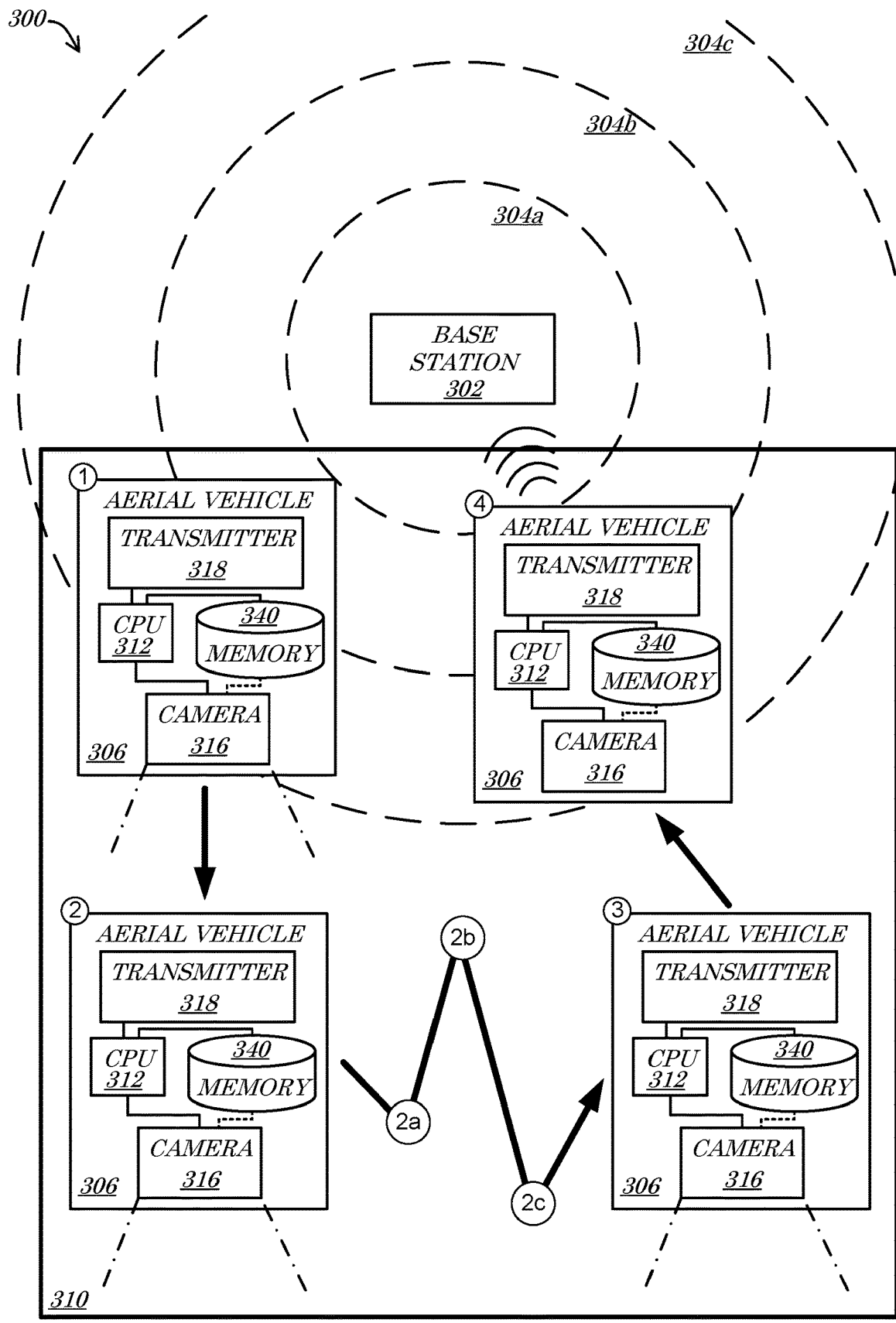
FIG. 3 is a block diagram of a system according to some embodiments.

Referring now to FIG. 3, a block diagram of a system 300 according to some embodiments is shown. In some embodiments, the system 300 may comprise a base station 302 that comprises a wireless communications capability defined by one or more signal ranges 304a-c. In some embodiments, the base station 302 may comprise a user device, such as a handheld electronic device, for example, and/or a freestanding mobile or stationary device. In some embodiments, the base station 302 may be in communication with an aerial vehicle 306 disposed to capture data descriptive of an area 310. According to some embodiments, the aerial vehicle 306 may comprise an electronic processing device, such as a CPU 312, communicatively coupled to a camera 316 (and/or other sensor). In some embodiments, the aerial vehicle 306 may comprise a transmitter 318 and/or a memory 340, e.g., in communication with the CPU 312. The illustrated embodiment is described with reference to one or more aerial vehicles. As disclosed herein, embodiments may be implemented using other types of autonomous vehicles or combinations thereof.

According to some embodiments, the aerial vehicle 306 may initiate a search, analysis, and/or mapping routine at a first location "1" in the area 310. In some embodiments, the aerial vehicle 306 may be placed, launched, and/or commanded to the first location "1" by the base station 302. According to some embodiments, the aerial vehicle 306 (and/or the CPU 312) may execute an autonomous data collection routine (e.g., stored in the memory 340; not separately shown) that causes the aerial vehicle 306 to traverse the area 310 and capture data descriptive of the area 310. In such a manner, for example, the aerial vehicle 306 (or a plurality of cooperative aerial vehicles 306, as described herein, but not separately shown in FIG. 3) may capture imagery (and/or other data) that may be utilized (e.g., by the CPU 312) to identify, characterize, and/or categorize a plurality of landmarks (not shown; e.g., the landmarks 208a-c of FIG. 2 herein) and/or develop a model of the area 310. According to some embodiments, an autonomous flight plan may also or alternatively be utilized to search for and/or identify damage to the area 310 and/or any landmarks therein. The autonomous flight plan may direct the aerial vehicle 306, for example, to move in a pattern (e.g., a grid-pattern) throughout the area 310 and take pictures (or other imagery or sensing activities) at various positions, altitudes, angles, and/or orientations to acquire data descriptive of any or all desired portions of the area 310. As depicted in FIG. 3, for example, the aerial vehicle 306 may autonomously navigate from the first location "1" to a second location "2", e.g., by engaging one or more thrust and/or lift mechanisms (not shown). In some embodiments, the aerial vehicle 306 may navigate directly from the first location "1" to a target location, such as the second location "2". Such autonomous navigation may be governed by stored logic that identifies the second location "2" as a desired location, such as a next point in a predefined search pattern or algorithm. According to some embodiments, the translation and/or movement from the first location "1" to the second location "2" may be also or alternatively governed and/or triggered by obstacle avoidance measures. The aerial vehicle 306 may utilize the camera 316 and/or another sensor, such as a proximity sensor (not shown), for example, to cause the aerial vehicle 306 to proceed from the first location "1" until the aerial vehicle 306 gets too close (e.g., within a predefined distance threshold) to an obstacle (not shown), thereby defining a stopping point, such as the second location "2".

In some embodiments, the aerial vehicle 306 may autonomously navigate in a pattern that includes various waypoints, such as locations "2a", "2b", and "2c", on the way to a third location "3". While the orientation of the camera 316 of the aerial vehicle 306 is depicted as fixed or uniform in FIG. 3 for convenience, the aerial vehicle 306 and/or the camera 316 may be disposed at different orientations at and/or between the various locations "1", "2", "2a", "2b", "2c", and "3". According to some embodiments, the camera 316 (and/or other sensor, such as a Light Detection and Ranging (LiDAR) sensor, an IR sensor, and/or a microwave sensor) may be oriented to capture data descriptive of identified extents of the area 310. In the case that the area 310 comprises a room of a building, for example, the aerial vehicle 306 may autonomously navigate (e.g., employing autonomous navigation and/or AI rules stored in the memory 340) to collect data descriptive of the entire floor area, wall area, and/or ceiling area of the room, as identified by the aerial vehicle 306 based on detected floor, wall, ceiling, doorway, and/or other architectural features and/or landmarks (not shown in FIG. 3). In such a manner, for example, the aerial vehicle 306 may navigate throughout multiple rooms of a structure to autonomously acquire detailed data (e.g., 3-D mapping data) descriptive of the entire structure (e.g., the entire area 310).

According to some embodiments, any or all imagery (and/or other acquired data) descriptive of the area 310 (and/or landmarks or objects thereof) may be transmitted by the aerial vehicle 306 to the base station 302. The aerial vehicle 306 and/or the base station 302 (e.g., the latter in response to the receiving of the imagery/data) may, in some embodiments, initiate one or more AI and/or other logical and/or rules-based programming routines (e.g., stored in the memory 340) to generate a digital map of the area 310, identify, classify, and/or characterize one or more objects/landmarks disposed in the area 310, identify any instances of damage to any of the objects/landmarks, identify features of the area 310, such as architectural and/or structural features, identify any instances of detected damage to the features of the area 310, and/or quantify any identified damage based on stored repair estimate data for any or all identified objects, landmarks, features, etc.

In some embodiments, the aerial vehicle 306 may identify that it is not disposed in one or more of the signal ranges 304a-c of the base station 302 and may navigate to a fourth location "4" to become disposed in one or more of the signal ranges 304a-c. Upon one or more triggering events, for example, the aerial vehicle 306 may initiate a data upload routine that attempts to transfer and/or transmit acquired data (e.g., sensor data from the camera 316) and/or generated data (e.g., a computed and/or generated 3-D map or model of the area 310) to the base station 302. In some embodiments, the upload routine may be triggered by a passage of a predetermined amount of time, an acquisition of a predetermined amount of data, a generation of a predetermined percentage or portion of a model and/or map of the area 310, and/or a completion of a data collection routine (or a portion thereof). The aerial vehicle 306 may, for example, attempt to transmit (e.g., via the transmitter 318) autonomous mapping data to the base station 302 once a discrete portion of the area 310 has been mapped (e.g., a particular room of a building) and/or once the memory 340 reaches a threshold level of storage (e.g., eighty percent (80%) full).

According to some embodiments, the aerial vehicle 306 may determine that it is out of range in various manners. The aerial vehicle 306 may, for example, utilize data descriptive of the first location "1", that may comprise a starting position of the aerial vehicle 306, in conjunction with aerial vehicle 306 movement data (e.g., routing, navigational, and/or accelerometer data) to calculate an expected distance between the base station 302 and the aerial vehicle 306. In some embodiments, the aerial vehicle 306 may calculate such an offset distance based on location data for the base station 302 stored in the memory 340 in conjunction with generated map data descriptive of the area 310 and calculated location data for the aerial vehicle 306. The location of the base station 302 may be known, for example, and the location of the aerial vehicle 306 in the area 310 may be calculated (e.g., based on flight data) to estimate an offset distance between the base station 302 and the aerial vehicle 306. According to some embodiments, regardless of how the offset distance is calculated or estimated, it may be compared to stored data descriptive of one or more of the signal ranges 304a-c to determine whether the aerial vehicle 306 is disposed within one or more of the signal ranges 304a-c.

In some embodiments, an out of range condition may be identified by transmission of a test signal or "ping" output by the transmitter 318. The CPU 312 may direct the transmitter 318 to output a signal directed to the base station 302 (directly and/or indirectly) upon occurrence of a triggering condition, for example, and the aerial vehicle 306 may listen for a return signal and/or response. In some embodiments, should a return or response signal or indication not be received by the aerial vehicle 306 (e.g., by the transmitter 318 in the case the transmitter 318 comprises a transceiver device) within a predetermined amount of time, an out of range condition may be presumed to exist. According to some embodiments, the test signal may not be necessary, as the base station 302 may transmit and/or broadcast an identifier signal that the aerial vehicle 306 may detect. In some embodiments, either or both of a response signal and the broadcast signal may be analyzed by the aerial vehicle 306 to identify an out of range condition. The strength of the signals from the base station 302 may be measured, for example, to identify which (if any) of the one or more of the signal ranges 304a-c the aerial vehicle 306 is disposed within.

According to some embodiments, the one or more of the signal ranges 304a-c may represent zones of differing signal strengths and/or bandwidths with respect to wireless communications with the base station 302. In some embodiments, the one or more of the signal ranges 304a-c may represent different ranges for different communication devices (not shown) and/or protocols utilized by the base station 302. According to some embodiments, upon identifying an out of range condition, the aerial vehicle 306 may autonomously navigate to the fourth position "4" that is within at least one of the one or more of the signal ranges 304a-c. The aerial vehicle 306 may determine a bearing of the base station 302 with respect to the aerial vehicle 306, for example, and navigate in the identified direction until the fourth location "4" is reached. In some embodiments, such as in the case that the area 310 comprises a building with multiple rooms and/or an area with obstructions, the aerial vehicle 306 may generate a navigational route that takes the aerial vehicle 306 to the fourth location "4" while avoiding obstructions and obstacles, such as walls, doorways, hanging fixtures, furniture, wires, tree branches, etc. In some embodiments, the aerial vehicle 306 may navigate to within a particular one of the one or more of the signal ranges 304a-c. The aerial vehicle 306 may, for example, identify an amount of data that needs to be transmitted to the base station 302 and may calculate or compute a bandwidth, transmission time, and/or other transmission parameter based on the data and a given signal strength, type, protocol, etc. According to some embodiments, the aerial vehicle 306 may identify one or more of the signal ranges 304a-c that are desirable and/or appropriate based on the data to be uploaded. In the case that a large amount of data requires transmission, for example, the aerial vehicle 306 may navigate into a first signal range 304a of the base station, e.g., that permits higher bandwidth transmissions and/or reduces the necessary transmission time. In the case that the transmission occurs as part of an autonomous data collection routine, but before the routine is complete (e.g., a partial data dump or data "pit stop"), for example, the aerial vehicle 306 may seek to reduce required transmission times to increase time available for data collection (e.g., before a power supply of the aerial vehicle 306 is drained). In some embodiments, the aerial vehicle 306 may navigate to within a second signal range 304b (or communication orientation or position, e.g., for line-of-sight communications) to utilize a particular type of wireless communication available with the base station 302. The second signal range 304b may represent, for example, a range and/or various specific positions (not separately indicated) from which the aerial vehicle 306 may conduct IR communications with the base station 302. The aerial vehicle 306 may identify such a desired and particular communication mechanism, in some embodiments, based on the data identified for uploading and/or based on environmental conditions of the area 310. In the case that visibility in the area 310 is limited (e.g., due to smoke), for example, the aerial vehicle 306 may navigate to an appropriate data offload location (e.g., the fourth location "4") based on a selected transmission methodology that is likely to maximize success for the transmission. According to some embodiments, such as in the case of line-of-sight transmissions and/or non-uniform signal strength ranges 304a-b, the aerial vehicle 306 may navigate to the fourth location "4", which may not be the closest attainable location to the base station 302 and/or may not be achieved utilizing the shortest path to the base station 302. The aerial vehicle 306 may autonomously navigate around smoke or other obstacles and/or may navigate through certain doorways, for example, to arrive at the fourth location "4", which is identified based on a comparison of various transmission parameters e.g., based on transmission rules/logic stored in the memory 340.

Fewer or more components 302, 304a, 304b, 304c, 306, 310, 312, 316, 318, 340 and/or various configurations of the depicted components 302, 304a, 304b, 304c, 306, 310, 312, 316, 318, 340 may be included in the system 300 without deviating from the scope of embodiments described herein. In some embodiments, the components 302, 304a, 304b, 304c, 306, 310, 312, 316, 318, 340 may be similar in configuration and/or functionality to similarly named and/or numbered components as described herein. In some embodiments, the system 300 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

III. Autonomous Hazardous Area Data Collection Processes

Figure 4:
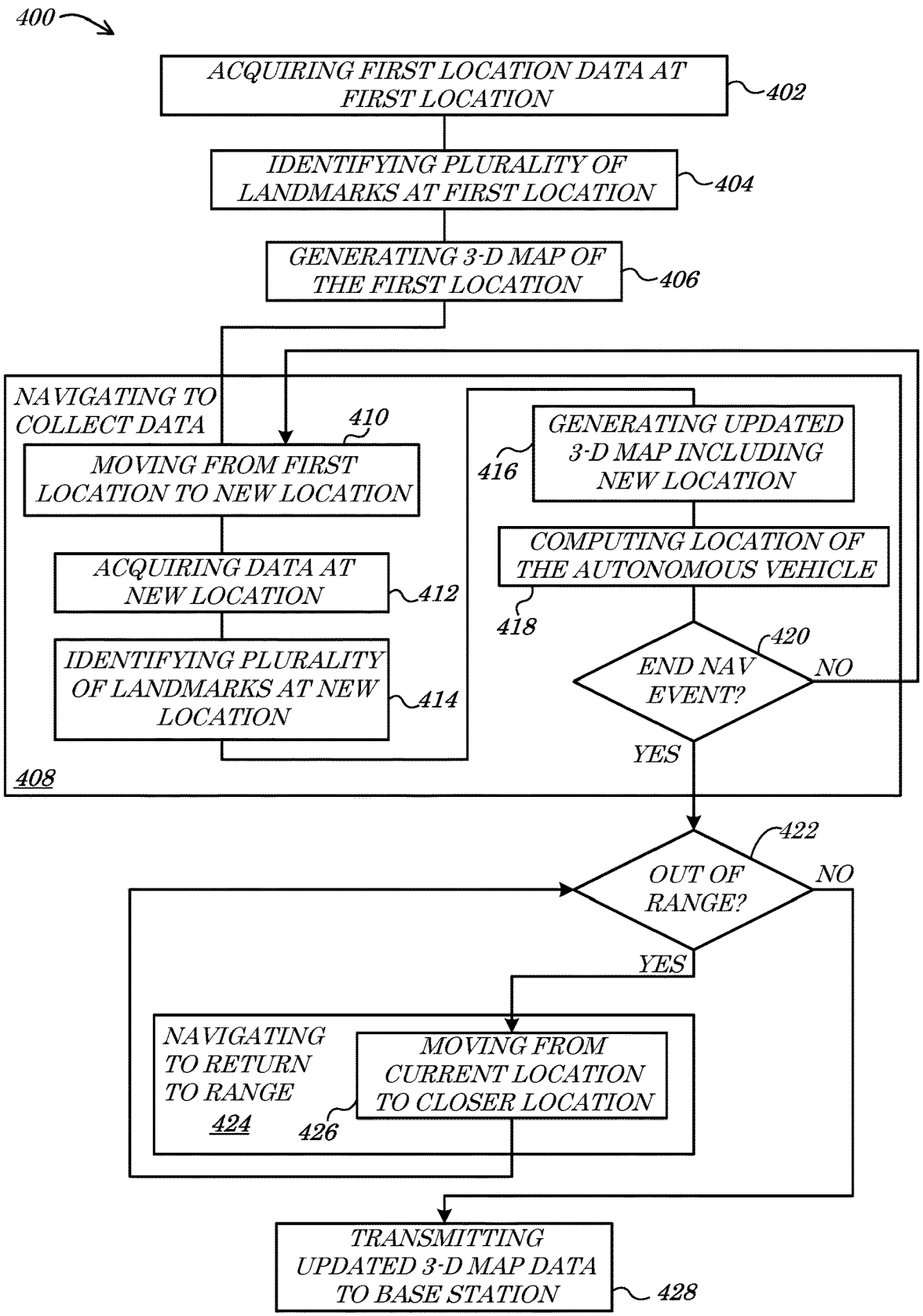
FIG. 4 is a flow diagram of a method according to some embodiments.

Turning now to FIG. 4, a flow diagram of a method 400 according to some embodiments is shown. In some embodiments, the method 400 may be performed and/or implemented by and/or otherwise associated with one or more specialized and/or specially-programmed computers (e.g., the mobile electronic device 102, 202, the base station 302, and/or the autonomous vehicle/drone/aerial vehicle 106, 206, 306 of FIG. 1, FIG. 2, and/or FIG. 3 herein), computer terminals, computer servers, computer systems and/or networks, and/or any combinations thereof (e.g., by one or more multi-threaded and/or multi-core processing units of an autonomous hazardous area data collection vehicle data processing system). In some embodiments, the method 400 may be embodied in, facilitated by, and/or otherwise associated with various input mechanisms and/or interfaces (such as the interfaces 220, 920, 1020 of FIG. 2, FIG. 9, and/or FIG. 10 herein).

Figure 10:
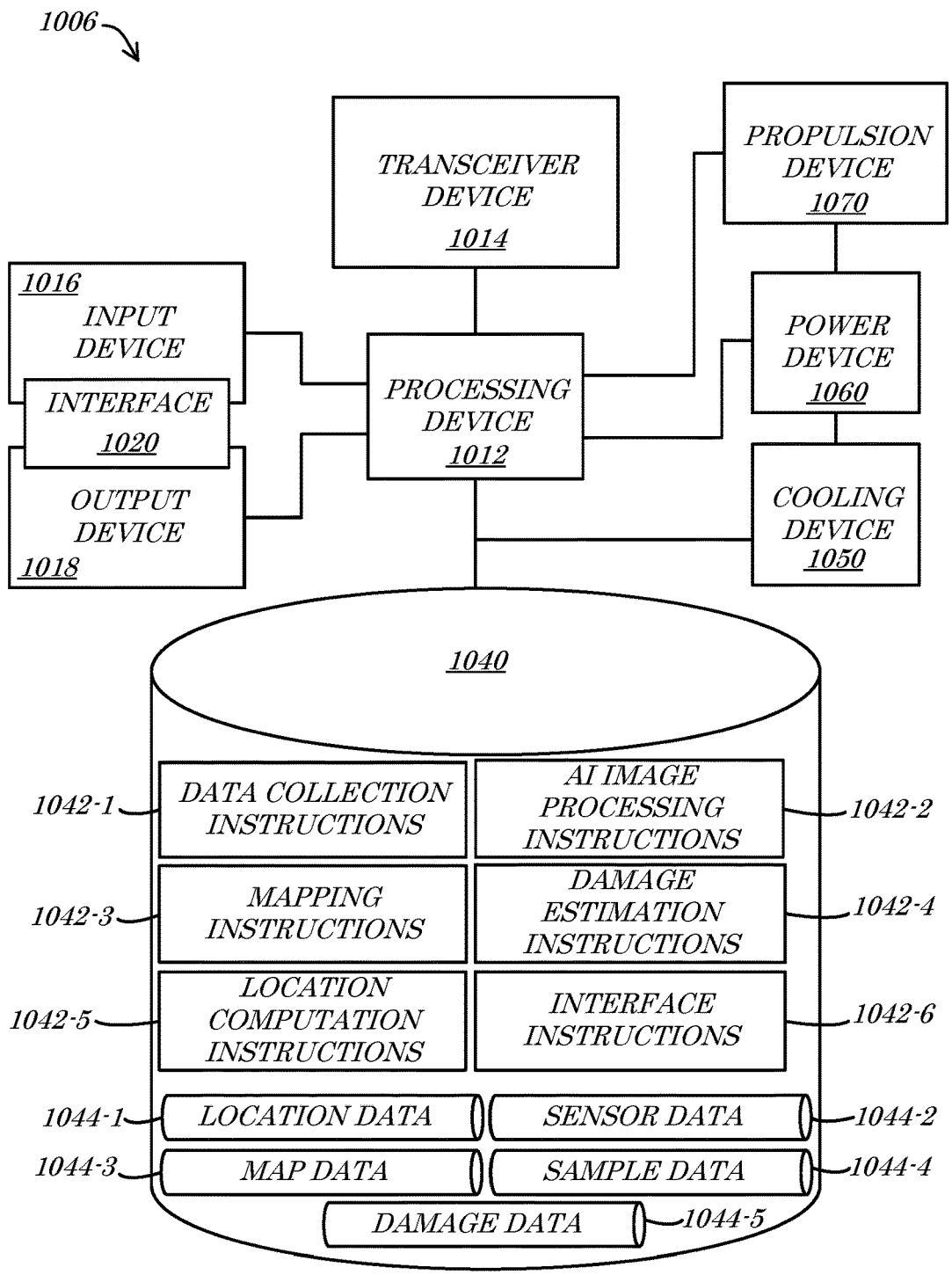
FIG. 10 is a block diagram of an apparatus according to some embodiments.
Figure 11A:
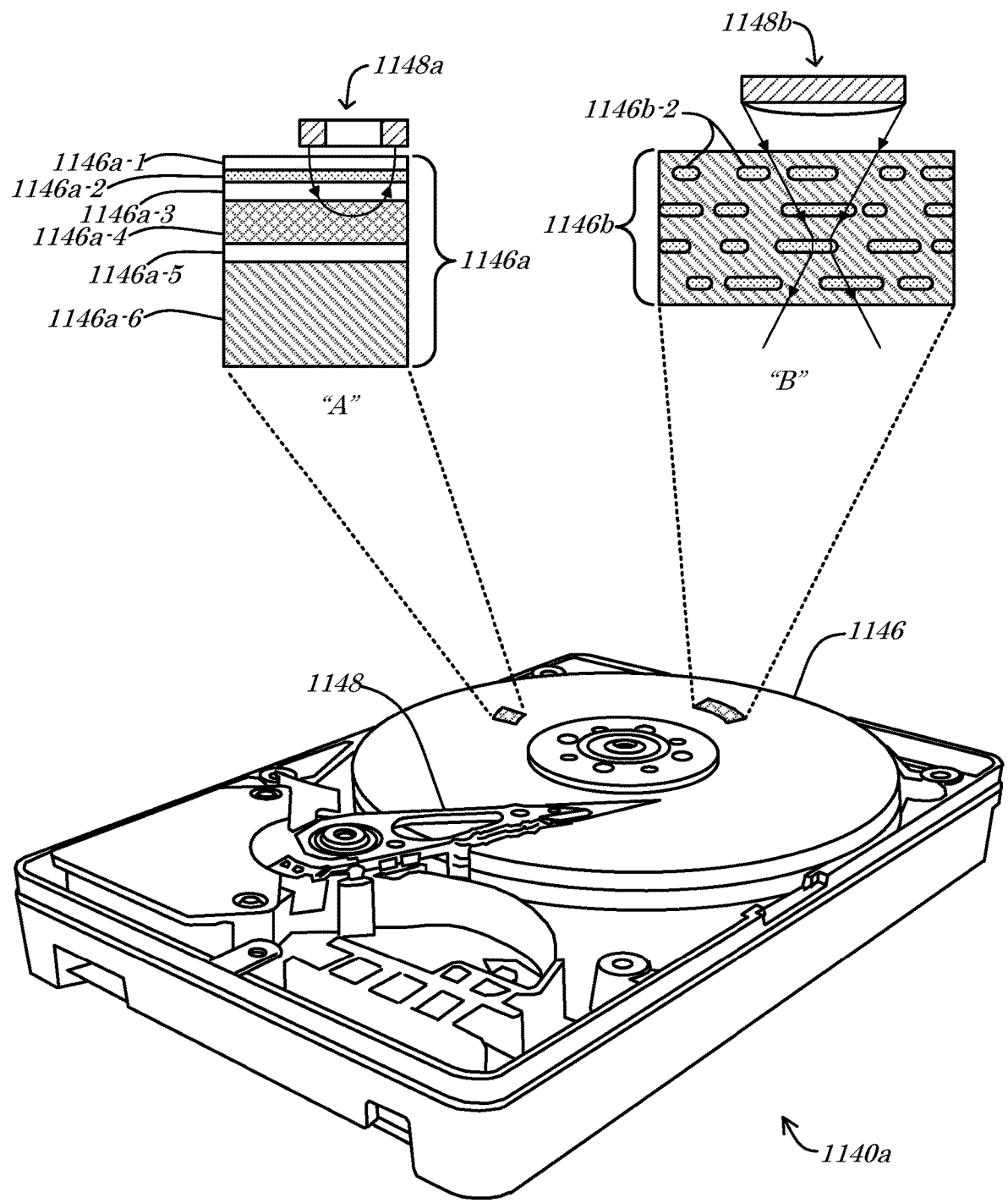
FIG. 11A, FIG. 11B, FIG. 11C, FIG. 11D, and FIG. 11E are perspective diagrams of exemplary data storage devices according to some embodiments.
Figure 11B:
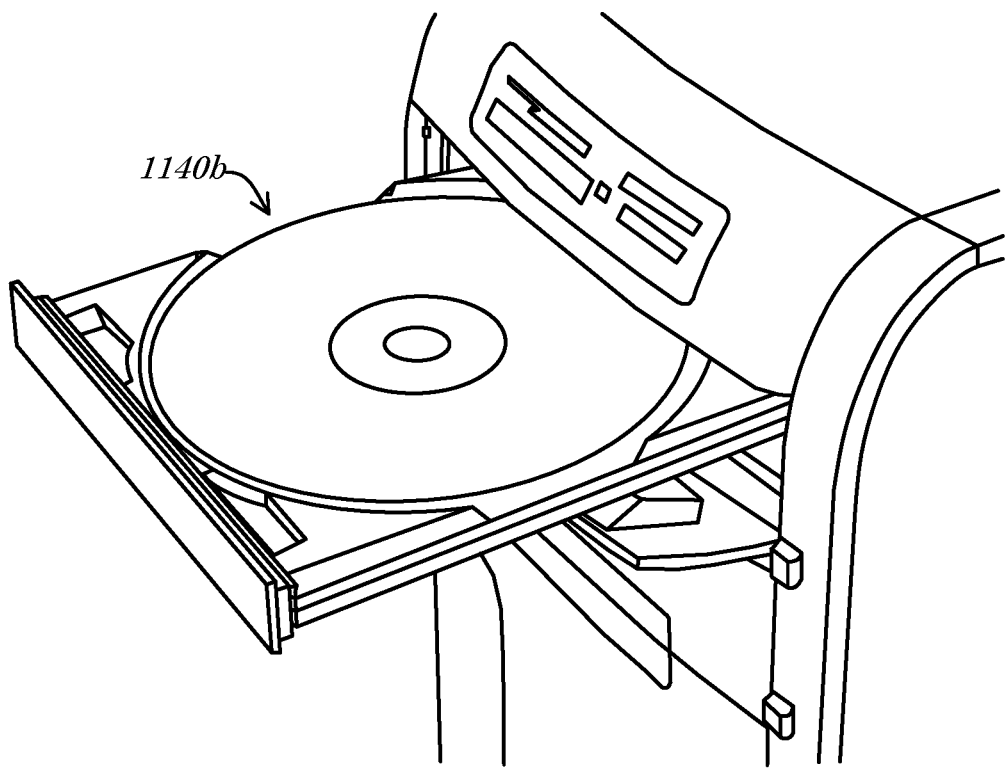
Figure 11C:
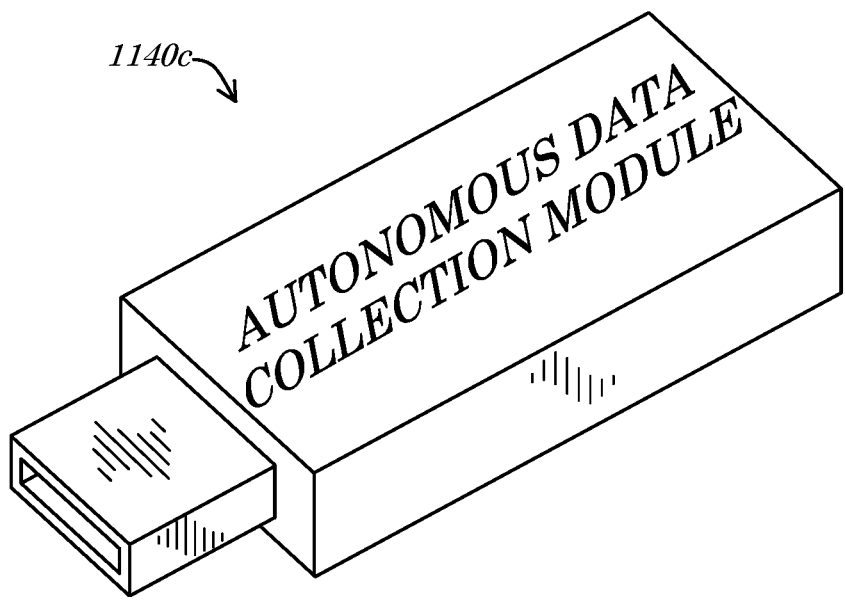
Figure 11D:
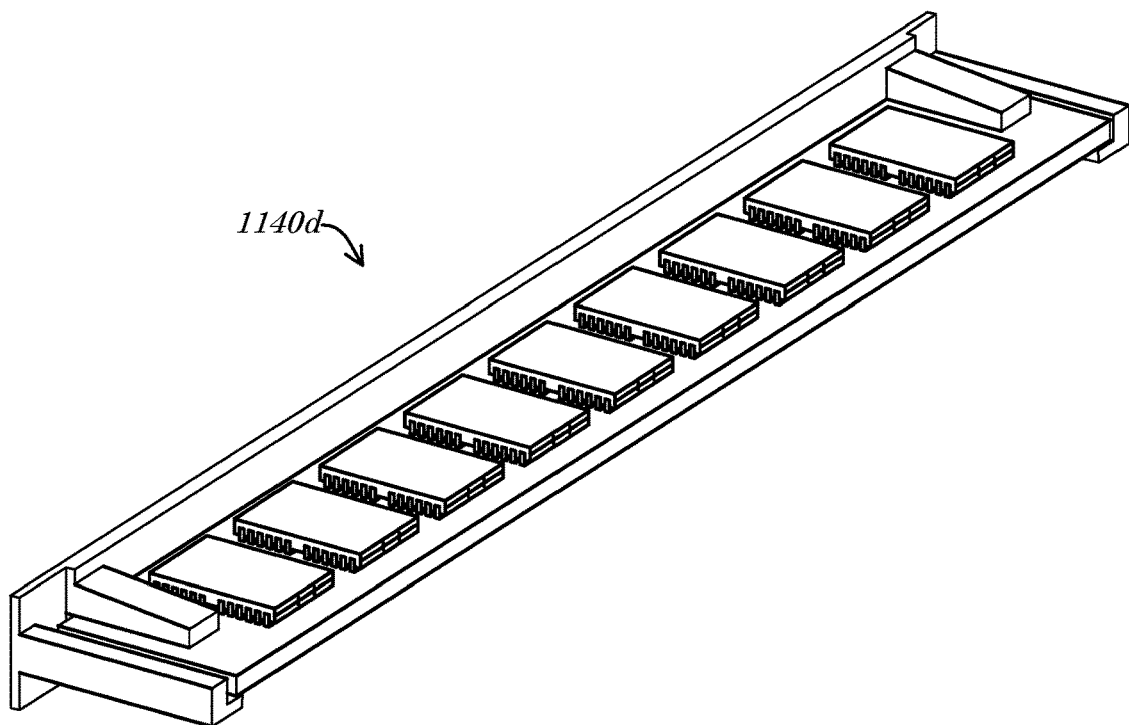
Figure 11E:
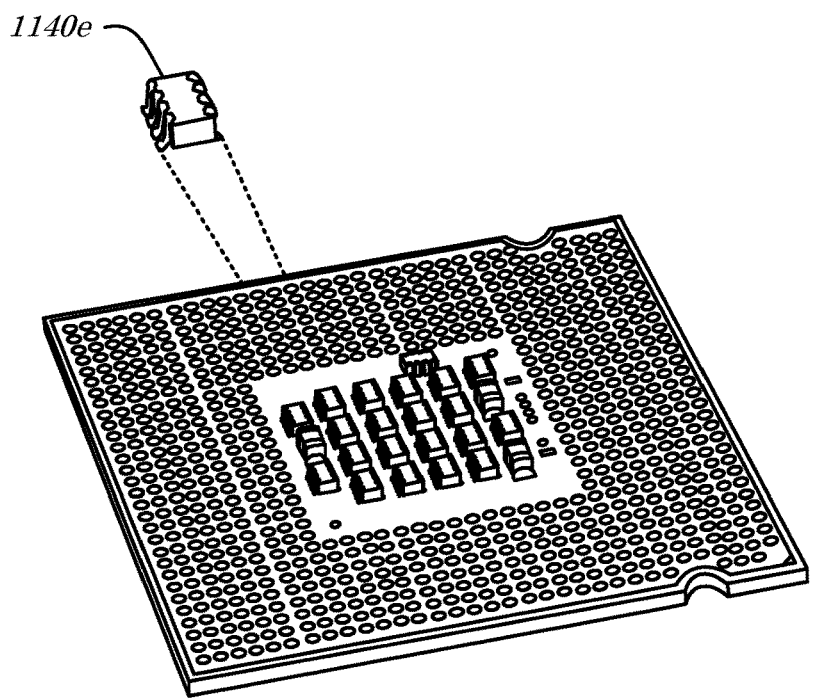

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240, 340, 540a-b, 640, 740, 840, 1040, 1140a-e of FIG. 1, FIG. 2, FIG. 3, FIG. 5, FIG. 6, FIG. 7, FIG. 8, FIG. 10, FIG. 11A, FIG. 11B, FIG. 11C, FIG. 11D, and/or FIG. 11E herein) may store thereon instructions that when executed by a machine (such as a computerized processor) result in performance according to any one or more of the embodiments described herein.

In some embodiments, the method 400 may comprise acquiring (e.g., by an autonomous vehicle) first location data at a first location (e.g., at a first time and at a first location), at 402. According to some embodiments, an autonomous vehicle may be directed to initiate an autonomous data collection routine and may be positioned at and/or commanded to navigate to the first location. A base station and/or user device may be utilized, for example, to launch and/or deploy the autonomous vehicle to the first location, such as a location identified as being proximate to a potentially hazardous (or otherwise hard to reach) area (e.g., the first location). A mobile user device may be utilized, in some embodiments, to deploy the autonomous vehicle to the first location that comprises an entrance to a damaged building or structure, an entrance to a mine or other cavity, and/or an extent (visually perceived, measured, and/or estimated) of a hazard, such as a fire, chemical leak, flood, etc. In some embodiments, the autonomous vehicle may respond to the command to deploy to the first location by engaging one or more movement mechanisms, such as wheels, tracks, rotors, control surfaces, propellers, ducted fans, etc. In some embodiments, a user of a mobile electronic device and/or of a server may, for example, open, run, execute, and/or allow or enable a software program and/or application programmed to initiate the autonomous assessment and/or analysis of damage at a location (e.g., the first location). In some embodiments, a specially-programmed mobile device application may be executed and/or initiated on a mobile device of a user, such as a smart phone device. According to some embodiments, the initiation of the application may cause an identification of the desired first location (e.g., a mailing address, geo-spatial coordinates, relative coordinates, and/or movement directions) to be transmitted, e.g., via a wireless network and/or utilizing a wireless transceiver device, to an autonomous vehicle.

In some embodiments, the acquiring may comprise capturing (e.g., by a camera and/or other sensor of the autonomous vehicle) first data of the first location. The autonomous vehicle may comprise, for example, any type or configuration of imaging and/or sensor device that is operable to acquire data descriptive of the first location. Upon reaching the first location, in some embodiments, the autonomous vehicle may activate the camera/sensor to acquire data of the first location. The data may generally comprise one or more photographs, video, and/or other sensor readings descriptive of a first portion of the hazardous area (e.g., the first location) that is within a field of view of the sensor of the autonomous vehicle, at the first location (e.g., at the first time). In some embodiments, the autonomous vehicle may capture imagery from multiple angles and/or may shift position (higher, lower, and/or laterally) to capture additional data of the same portion of the area from a slightly different position—e.g., to acquire a set of first data in accordance with appropriate photogrammetric and/or analysis procedures. According to some embodiments, the capturing may be conducted in response to and/or as a result of an execution of an autonomous data collection routine (e.g., stored in a memory device of the autonomous vehicle) executed by an electronic processing device of the autonomous vehicle. In some embodiments, any or all data defining the first data and/or imagery may be transmitted to the user device and/or base station.

According to some embodiments, the method 400 may comprise identifying (e.g., by the electronic processing device) a plurality of landmarks at the first location, at 404. Upon capturing the first data, for example, the autonomous vehicle may execute and/or initialize one or more stored procedures and/or analytical routines, such as a first AI module (e.g., the AI image analysis module 242b of FIG. 2 herein). The first AI module may comprise programming logic that searches the first data/imagery for shapes, colors, and/or other features or objects indicative of the various landmarks at the first location. According to some embodiments, the first AI module may utilize one or more shape and/or pattern identification algorithms to identify areas within the first data/imagery that match stored shapes/patterns indicative of various architectural, structural, natural, and/or other objects. In some embodiments, the first AI module may identify each discrete object in the first data/imagery and/or may identify and/or record a location (centroid, edge, opening, surface, and/or polygon vertices representing an outline) for each object/landmark. According to some embodiments, the boundaries and/or other identified features of the landmarks may be output to a remote user for verification and/or editing. A user of a remote user device that receives indications of the identified landmarks from the first AI module (e.g., via a GUI) may, for example, provide input selecting which object identifications to accept, delete, combine, separate, etc.

In some embodiments, the method 400 may comprise generating (e.g., by the electronic processing device) a 3-D map of the first location, at 406. The electronic processing device may execute a stored data analysis and/or 3-D mapping routine, for example, that utilizes the first data as input to generate a 3-D surface representation of the first portion of the hazardous area (e.g., the first location) sensed by the autonomous vehicle from the first location (e.g., at a first time). According to some embodiments, the 3-D map may comprise a mathematical model that represents the various orientations and locations of identified points throughout the first portion of the hazardous area. The map/model may, for example, comprise a mathematical representation and/or data set descriptive of a room of a building, including floor, ceiling, wall, and/or furniture surfaces, edges, junctions, etc. In some embodiments, the map/model may distinguish fixed objects and/or features, such as doorways, walls, and duct work from moveable or transient objects, such as desks, chairs, cabinets, people, etc.

According to some embodiments, the method 400 may comprise navigating to collect data, at 408. An autonomous data collection routine may be executed by the electronic processing device of the autonomous vehicle, for example, to navigate throughout the hazardous area to obtain data descriptive of a desired portion, percentage, and/or coverage of the area. In some embodiments, the navigating may comprise the autonomous vehicle moving from the first location to a second or new location, at 410. The executed navigational routine may, for example, utilize the first data and/or the map/model to identify and/or project a desired second location for the autonomous vehicle, such as a point near at least one edge or extent of the captured first data. According to some embodiments, the second/new location may be identified and/or selected based on one or more of the identified plurality of landmarks (e.g., at 404). The nature of the landmarks as having features that were already identified may, for example, make the landmarks more easily distinguishable and/or more likely to be repeatedly and/or reliably identified by the sensor(s), providing for more reliable navigational waypoints. In some embodiments, once the second/new location has been identified and/or selected, the autonomous vehicle may navigate to the second/new location by activating a propulsion device and/or one or more control surfaces and/or directional mechanisms to achieve the desired second location (e.g., altitude, orientation, etc.). The autonomous vehicle may comprise one or more propulsion devices powered by a power supply, such as a battery, for example, and may energize the propulsion device upon receiving, e.g., from the electronic processing device, the command(s) to reposition. According to some embodiments, the second/new location may be achieved by comparing live feed from the sensor/camera of the autonomous vehicle to one or more sample images and/or boundary data items to identify when the extents of a desired second/new location fit within a field of view of the camera/sensor. The autonomous vehicle may continuously monitor the sensor/camera feed as it navigates, for example, and upon an identification of the extents of the second/new location existing within the field of view, may stop and/or may otherwise hold position (e.g., the second/new location with respect to the target location).

In some embodiments, the navigating may comprise acquiring and/or capturing second/additional data at and/or from the second/new location, at 412. The sensor may be activated, for example to acquire and/or capture data descriptive of a second/new portion of the hazardous area (e.g., the second/new location) that is visible (or otherwise discernable) from the second/new location. According to some embodiments, at least a sub-portion of the second/new location may overlap with and/or comprise a sub-portion of the first location described by the first data. The second/new location may be selected, for example, such that the second/additional data achieves a desired level or amount of overlap with the first data. In such a manner, for example, spatial orientation and distances may be either verified or derived, even from still imagery data, e.g., utilizing stereophotogrammetry and/or 3-D reconstruction techniques.

According to some embodiments, the navigating may comprise identifying a plurality of landmarks at the second/new location, at 414. The second/new/additional data may be analyzed, for example, utilizing one or more AI routines, such as the first AI routine utilized with respect to the first data. The first AI routine may, in some embodiments, conduct an image and/or pattern analysis to identify the plurality of landmarks. In some embodiments, the landmarks may be identified by comparing the second/new/additional data to one or more stored reference images, shapes, and/or patterns. According to some embodiments, one or more of the landmarks may be identified as one of the landmarks from the first data. The general autonomous navigation process may comprise, for example, acquiring and/or capturing overlapping data sets to identify and/or describe common landmarks so that the various data sets may be combined in the proper spatial orientation.

In some embodiments, the navigating may comprise generating an updated 3-D map including the second/new location, at 416. The second/new/additional data may be utilized, for example, to generate a new 3-D map and/or model descriptive of the second portion of the hazardous area (e.g., the second/new location). According to some embodiments, the new map/model may be stitched to and/or combined with the original map/model, e.g., utilizing one or more points of reference, such as a location of a common landmark for reference. In some embodiments, multiple sensor readings and/or data points may be identified as being common to both data sets and may be utilized to combine any map/model data based on the second/new data with that from the first data. In some embodiments, one or more mathematical algorithms may be utilized to stitch together the map/model portions and/or to smooth any areas of transition and/or overlap between the portions of the map/model.

According to some embodiments, the navigating may comprise computing a location of the autonomous vehicle, at 418. The autonomous vehicle may, for example, utilize stored data descriptive of the first location, combined with either or both of movement data (e.g., from an onboard accelerometer) and/or the generated map/model to calculate an estimated location and/or position/orientation of the autonomous vehicle. In the case that the coordinates of the first location are known (e.g., provided by the user device and/or base station to initiate the autonomous data collection routine), for example, flight and/or map data descriptive of the autonomous movements of the autonomous vehicle may be utilized to adjust the original coordinates to derive and/or define new coordinates descriptive of the current location of the autonomous vehicle. In some embodiments, the navigating may comprise an execution of a VSLAM navigational routine that calculates the current location of the autonomous vehicle by comparing common data points (such as the identified landmarks) across successive data captures (e.g., the first data and the second/new data). In such a manner, for example, the autonomous vehicle may both map and navigate through the hazardous area in an autonomous manner.

In some embodiments, the method 400 may comprise determining (e.g., by the electronic processing device) whether to end the autonomous navigation event/process, at 420. The autonomous vehicle may store (e.g., in a memory device) an indication of the extents of the autonomous data collection mission, for example, such as geographic extents (e.g., geo-fencing), logical extents (e.g., limited to a particular floor or area of a building), and/or operational extents (e.g., until battery life decreases to a minimum threshold level, until data storage is filled to a certain percent or level, etc.). According to some embodiments, the autonomous vehicle (e.g., the electronic processing device thereof) may compare any stored operational extent parameters to current parameters (e.g., current location as calculated at 418, current battery level, current data storage level, etc.) to determine whether additional data should be collected. In some embodiments, such as in the case that no triggering event or condition has been identified that indicates a need to end the data collection process, the method 400 may return back to continue the navigating at 408 by moving from a current location to a new location, at 410.

According to some embodiments, in the case that a triggering event or condition has been identified that indicates a need to end the data collection process, the method 400 may comprise determining (e.g., by the electronic processing device) whether the autonomous vehicle is out of range with respect to a base station, at 422. The autonomous vehicle may store (e.g., in the memory device) an indication of a location of the base station (e.g., coordinates), for example, and may compare the current location of the autonomous vehicle (e.g., calculated at 418) to the location of the base station to derive a distance between the autonomous vehicle and the base station. According to some embodiments, the autonomous vehicle (e.g., the electronic processing device thereof) may compare the calculated/derived distance or range to any stored wireless communication threshold parameters to determine whether the current location of the autonomous vehicle places the autonomous vehicle within an operational communication range of the base station. In some embodiments, the autonomous vehicle (and/or a receiver or transceiver device thereof) may receive a signal from the base station. According to some embodiments, in the case that such a signal is received it may be presumed that the autonomous vehicle is within range. In some embodiments, the signal may be measured and compared to stored signal strength threshold parameters to determine whether the strength of the signal is adequate for the autonomous vehicle to be considered to be within operational communication range. In some embodiments, if a repeating broadcast signal from the base station is not received within a predetermined amount of time (e.g., a five (5) second repeating broadcast is not received in a fifteen (15) second time window), the autonomous vehicle may be determined to be out of range. According to some embodiments, the autonomous vehicle (and/or a transmitter or transceiver thereof) may actively send a test signal (e.g., a "ping") to the base station and await a response. In the case that a response is not received within a predetermined time window and/or the response indicates poor communications quality, the autonomous vehicle may be determined to be out of range.

In some embodiments, such as in the case that the autonomous vehicle is determined to be out of range (e.g., at 422), the method 400 may proceed to conduct a navigation to return to range, at 424. The navigation may, for example, comprise the autonomous vehicle moving from the current location to a closer (with respect to the base station) location, at 426. While the term "closer" is utilized for convenience, in some embodiments the new location to which the autonomous vehicle navigates may be farther from the base station, but may provide for improved communications capabilities. In line-of-sight communication situations, for example, the operational communication range may comprise a combination of range or distance and quality of communication path between the autonomous vehicle and the base station. In the case that the autonomous vehicle is only ten (10) feet from the base station, but on the other side of a wall, for example, communications may be improved by moving twenty (20) feet away, but in front of a window or having exited a doorway, such that the communications path between the autonomous vehicle and the base station is more clear than when the wall was impeding. According to some embodiments, the navigating at 424 and/or the moving at 426 may comprise identifying a new location that is likely to provide for desirable wireless communication quality. The autonomous vehicle (e.g., the electronic processing device thereof) may, for example, identify a location on the generated 3-D map/model that is determined to have an acceptable communications parameter score and be the shortest distance from the current location. Communications parameters, such as range, type, protocol, hardware constraints and/or capabilities, power usage requirements, line-of-sight availability, and/or other communications path parameters may be calculated for a plurality of locations, for example, and the values, points, scores, and/or rankings may be utilized to select the point to which the autonomous vehicle should move to attempt to return to an operational communication range. In some embodiments, the autonomous vehicle may activate one or more propulsion and/or control devices to move to the designated in-range location. According to some embodiments, the autonomous vehicle may utilize the generated map/model of the hazardous area to plan an obstacle-free route to a desired in-range location. In some embodiments, the autonomous vehicle may retrace an original path that was utilized to arrive at the current location. According to some embodiments, operational constraints, such as remaining battery life, maximum speed, altitude constraints (e.g., ceilings, smoke, low hanging wires) may be analyzed to plot the route to the desired in-range location. In some embodiments, such as in the case that the autonomous vehicle is attempting to return to range to offload data as a waypoint during a continued autonomous data collection routine, both the path to the in-range location and the path to return to the data collection routine may be taken into account in selecting a desirable in-range point.

According to some embodiments, once the autonomous vehicle has moved to the new in-range location, the method may return to verify whether the autonomous vehicle is out of range, at 422. In the case that the autonomous vehicle remains out of range, the method 400 may once again attempt to place the autonomous vehicle in range of the base station by proceeding to navigate to return to range, at 424. In the case that the autonomous vehicle is determined to be within range, the method 400 may proceed to transmit (e.g., by the electronic processing device and/or the transceiver device) the updated 3-D map data to the base station, at 428. The autonomous vehicle may, as described herein, for example, comprise an inexpensive autonomous mechanism that is operable to self-navigate through hazardous (or other difficult) areas and report to a base station (such as a user's handheld electronic device) data descriptive of the area—e.g., without requiring human personnel to be exposed to the risks of the area. In some embodiments, the data reported back to the user may comprise the 3-D map/model generated by the autonomous vehicle based on the collected data. According to some embodiments, the map/model may be rendered or displayed on the user's device, such that the user may remotely inspect the hazardous area without being subject to harm. In some embodiments, in addition to the map/model data, the autonomous vehicle may sense, record, analyze, and/or transmit sensor readings to the base station. In the case of a hazardous gas (or other chemical) leak in a building, for example, the autonomous vehicle may report with a comprehensive 3-D map of the interior of the building, along with data descriptive of gas sensor readings taken at various points within the building. The autonomous vehicle may provide a data layer or "heat map" with or as part of the map/model, for example, that graphically depicts area of higher and lower sensor readings.

In some embodiments, the transmitted data may comprise data descriptive of the occurrence, type, and/or magnitude of damage to one or more objects in or at the hazardous area. The autonomous vehicle may execute and/or initialize one or more stored procedures and/or analytical routines, such as a second AI module (e.g., the AI image analysis module 242b of FIG. 2 herein), for example, to identify damage sustained by the various objects in the area. The second AI module may comprise programming logic that searches the first and/or second/new data and/or imagery for shapes, colors, data points, and/or other objects indicative of visible damage (e.g., fire damage, water damage, structural damage), for example, and catalogs a type and/or estimated extent of damage based on data/imagery analysis results. The first and/or second/new data and/or imagery may be utilized, for example, to identify any areas of visible damage to a particular discrete object (e.g., a landmark) and/or a type of damage, such as cracked window, damaged sheetrock, exposed electrical wires, burst plumbing, etc.

In some embodiments, the method 400 may comprise calculating (e.g., by the electronic processing device) an estimated amount of damage. The autonomous vehicle may execute and/or initialize one or more stored procedures and/or analytical routines, such as a third AI module, for example, to quantify or estimate an amount of the identified damage sustained by the objects. The third AI module may comprise programming logic that searches stored data (e.g., a repair estimate database) based on the identified type of damage and discrete object identification information (e.g., building type, construction type, appliance brand and model), for example, to calculate a total estimated monetary amount that would be required to repair the identified damage (e.g., replace a broken window and/or repair/replace a damage appliance). According to some embodiments, a total amount of estimated damage/repair costs for all of the discrete objects at the location may be calculated by summing the individual estimates for each discrete object. According to some embodiments, such information may be transmitted to the base station with or instead of the 3-D map/model at 428.

While the processing, analysis, identification, and/or calculation features of the method 400 are generally described as being performed by the autonomous vehicle and/or the electronic processing device thereof, certain processes and/or analysis may be conducted by the base station/user device. The autonomous vehicle may capture the requisite data, generate and utilize the 3-D map/model, and acquire sensor data descriptive of one or more hazards in the area, for example, and may upload the sensor data to the base station/user device for further analysis (e.g., safe-to-enter determinations, damage calculations, etc.).

IV. Additional Autonomous Hazardous Area Data Collection Systems

Figure 5:
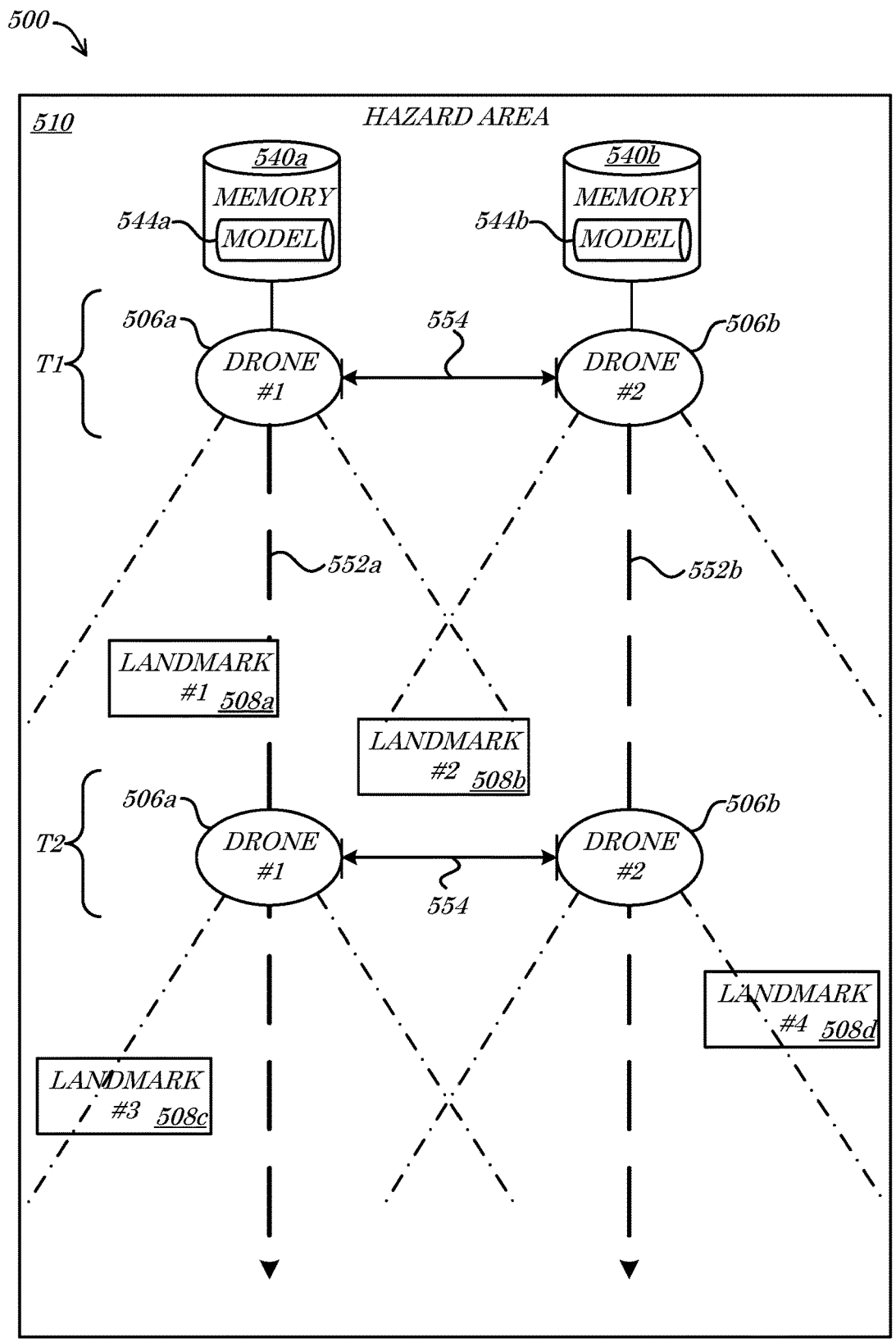
FIG. 5 is a block diagram of a system according to some embodiments.

Turning now to FIG. 5, a block diagram of system 500 according to some embodiments, is shown. In some embodiments, the system 500 may comprise a plurality of drones 506a-b disposed to capture imagery (and/or other data) descriptive of a plurality of objects or landmarks 508a-d disposed in a hazard area 510 (and/or of the hazard area 510 itself). Each landmark 508a-d may comprise, for example, various architectural features, obstacles, and/or items disposed in a building (not explicitly shown) into which the drones 506a-b have been sent to autonomously acquire data. According to some embodiments, each drone 506a-b may comprise and/or be in communication with a memory 540a-b and/or may comprise a sensor (not separately shown) having a field of view as indicated by the dashed lines in FIG. 5.

In some embodiments, the system 500 may be utilized to employ the plurality of drones 506a-b instead of a single drone 506a-b to decrease the time needed to acquire sensor coverage of the hazard area 510 and/or to provide redundancy (e.g., in case one of the drones 506a-b should malfunction or become damaged). According to some embodiments, the drones 506a-b may cooperatively traverse the area 510 to capture data descriptive of the area (such as damage and/or hazard data) and/or to generate maps and/or models 544a-b, e.g., that are stored in the respective memories 540a-b. In some embodiments, each drone 506a-b may follow a flight plan 552a-b, such as the example linear flight plans 552a-b depicted in FIG. 5, that maintains a formation offset distance 554 between the adjacent cooperating drones 506a-b.

According to some embodiments, the drones 506a-b may capture data within their respective fields of view at a first time "T1" and each drone 506a-b may progress along a respective flight path 552a-b through the area 510, e.g., while continuing to capture data descriptive of the area 510. In some embodiments, the drones 506a-b may identify, classify, and/or locate (e.g., define a location descriptor for) one or more of the landmarks 508a-d. As depicted in FIG. 5, for example, a first drone 506a may sense and/or capture data descriptive of each of a first landmark 508a and a second landmark 508b within the field of view, range, and/or operational sub-area of the first drone 506a. According to some embodiments, a second drone 506b may sense and/or capture data descriptive of the second landmark 508b within the field of view, range, and/or operational sub-area of the second drone 506b. As shown in FIG. 5, each drone 506a-b may capture data descriptive of an overlapping sub-area of the area 510, such as the sub-area including the second landmark 508b. In such a manner, for example, each drone 506a-b may capture data descriptive of the sub-areas traversed and generate a respective model and/or map 544a-b of a portion of the area 510. One or more of the drones 506a-b (and/or a separate processing device; not shown) may, in some embodiments, utilize overlapping data, such as data descriptive of the second landmark 508b, to merge, orient, and/or stitch together the separate maps/models 544a-b. In such a manner, for example, a comprehensive map/model 544a-b of the area 510 may be developed in a shorter amount of time than if a single drone 506a-b were utilized.

In some embodiments, the drones 506a-b may navigate to maintain the formation offset distance 554. The formation offset distance 554 may, for example, comprise a minimum or maximum distance that is desired to be maintained between the drones 506a-b. According to some embodiments, the formation offset distance 554 may be calculated and/or selected to define a desirable amount and/or extent of overlap between the fields of view of the sensors of the drones 506a-b. In the case that the area 510 is extremely detailed, rugged, or difficult to analyze, for example, the formation offset distance 554 may be set to a smaller distance to increase the level of overlap and therefore the level of redundancy of the sensed data descriptive of the area 510. In the case that the drones 506a-b are set to navigate their flight paths 552a-b at a higher altitude, in some embodiments the formation offset distance 554 may be set to a larger distance to account for the fact that field of view intersections and resulting overlap may be maintained at desired levels even with greater separation due to the geometry of the sensor fields of view.

According to some embodiments, the drones 506a-b may utilize their respective captured data including data descriptive of the first and second landmarks 508a-b to generate respective maps/models 544a-b (e.g., at the first time "T1") which may then be utilized to navigate the drones 506a-b to new positions along their respective flight paths 552a-b. In some embodiments, the drones 506a-b may capture additional data at the new locations and at a second time "T2". As depicted in FIG. 5, the first drone 506a may identify a third landmark 506c within its field of view and/or the second drone 506b may identify a fourth landmark 506d in its respective field of view. According to some embodiments, the captured data and/or models/maps 544a-b may be shared between the drones 506a-b (and/or transmitted to a remote device, not shown). In some embodiments, the flight paths 552a-b may diverge and/or the formation offset distance 554 may vary over time and/or space. The drones 506a-b and their respective positions and models/maps 544a-b may be synchronized at one or more times and/or locations, such as at their first positions and at the first time "T1" in FIG. 5, for example, and then may diverge and/or reduce or eliminate data overlap. According to some embodiments, divergence of the flight plans 552a-b may be followed by a reunion governed by an appropriate formation offset distance 554, where data overlap comparison procedures may be utilized to resynchronize and/or adjust the respective maps/models 544a-b (e.g., at the second time "T2"). In some embodiments, the plurality of drones 506a-b may be increased and/or the cooperative nature of the flight plans 552a-b may be more complex, as desired.

Fewer or more components 506a-b, 508a-d, 510, 540a-b, 544a-b, 552a-b, 554a-b and/or various configurations of the depicted components 506a-b, 508a-d, 510, 540a-b, 544a-b, 552a-b, 554 may be included in the system 500 without deviating from the scope of embodiments described herein. In some embodiments, the components 506a-b, 508a-d, 510, 540a-b, 544a-b, 552a-b, 554 may be similar in configuration and/or functionality to similarly named and/or numbered components as described herein. In some embodiments, the system 500 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

Figure 6:
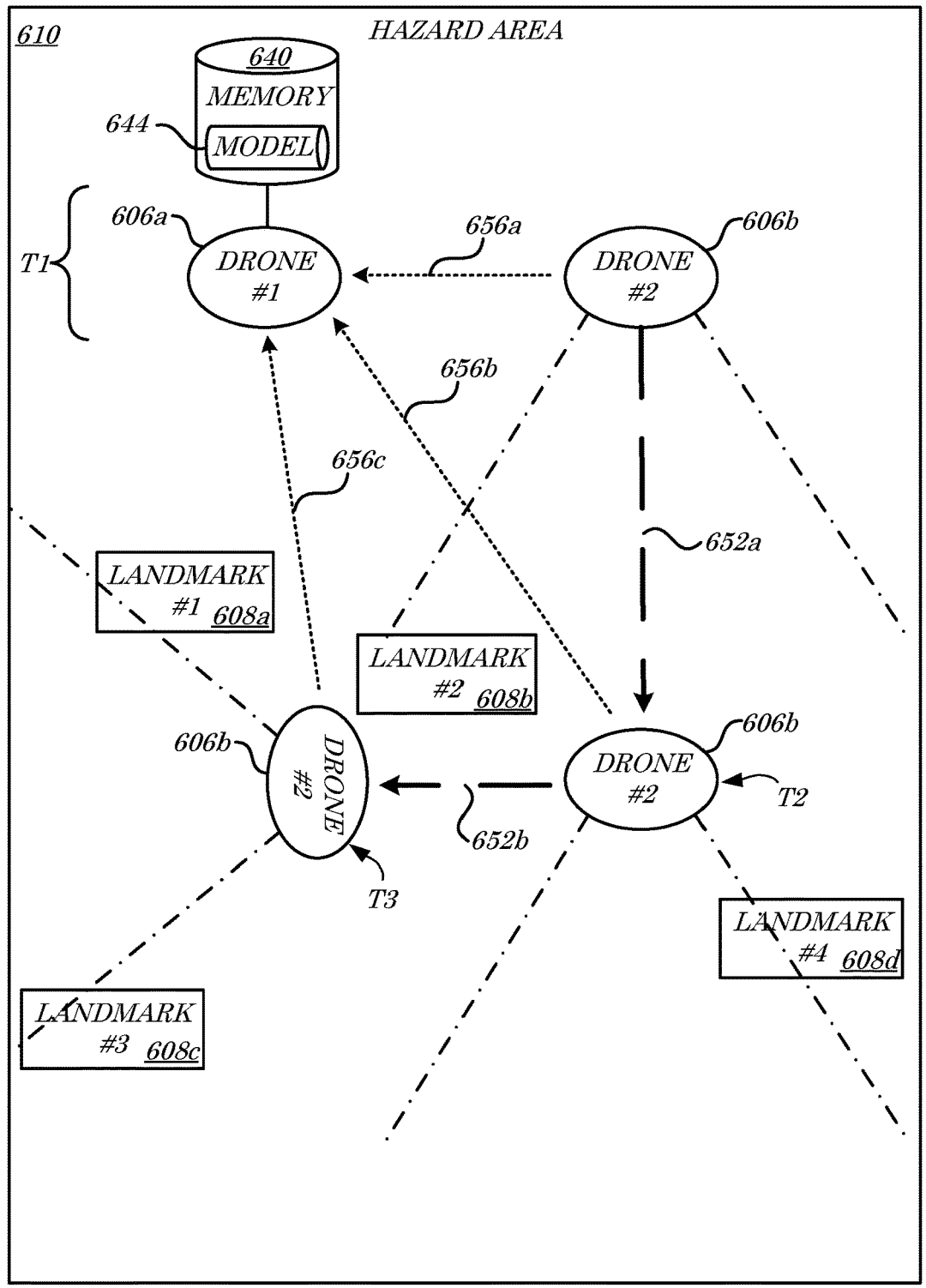
FIG. 6 is a block diagram of a system according to some embodiments.

Referring now to FIG. 6, a block diagram of system 600 according to some embodiments, is shown. In some embodiments, the system 600 may comprise a plurality of drones 606a-b disposed to capture imagery (and/or other data) descriptive of a plurality of objects or landmarks 608a-d disposed in a hazard area 610 (and/or of the hazard area 610 itself). Each landmark 608a-d may comprise, for example, various architectural features, obstacles, and/or items disposed in a building (not explicitly shown) into which the drones 606a-b have been sent to autonomously acquire data. According to some embodiments, the drones 606a-b may comprise and/or be in communication with a memory 640 (e.g., storing a model 644) and/or may comprise one or more sensors (not separately shown) having a field of view as indicated by the dashed lines in FIG. 6.

In some embodiments, the system 600 may be utilized to employ a primary or first drone 606a comprising the memory 640 and a cooperative secondary or second drone 606b (e.g., not in direct communication with the memory 640 and/or comprising a smaller on-board memory storage capability). In such a manner, for example, the first drone 606a may have more sophisticated equipment and functionality and, therefore, may be more costly than the second drone 606b. The first drone 606a may, accordingly, be utilized as a "mothership" or data upload station for the second drone 606b. Should the second drone 606b be lost or damaged in the hazard area 610, it may, therefore, be more easily replaced, and any data that had been uploaded to the first drone 606a (as well as the first drone 606a itself) would remain viable. According to some embodiments, the drones 606a-b may be utilized to cooperatively map and/or analyze the hazard area 610. At a first time "T1", for example, the first drone 606a may acquire a desired position within (or near) the hazard area 610 and the second drone 606b may acquire an initial data capture position within the hazard area 610.

According to some embodiments, the second drone 606b may capture data within the field of view at a first time "T1" (e.g., including data descriptive of a second landmark 608b) and then move in accordance with a flight plan 652a-b through the area 610, e.g., while continuing to capture data descriptive of the area 610. The second drone 606b may capture data descriptive of a fourth landmark 608d at a second time "T2" after having completed a first flight plan 652a, for example, and/or capture data descriptive of a first landmark 608a and a third landmark 608c at a third time "T3" after having completed a second flight plan 652b. As depicted in FIG. 6, the second drone 608b may change orientations (e.g., of the sensor and/or of the second drone 608b) as part of the second flight plan 652b. In some embodiments, changing of orientations and/or altitudes (and/or speeds) may be governed by an autonomous flight plan routine and may occur at predefined intervals and/or locations and/or may be triggered by analysis of captured data. In some embodiments, the second drone 606b may identify, classify, and/or locate (e.g., define a location descriptor for) one or more of the landmarks 608a-d.

In some embodiments, the second drone 608b may send indications of the captured data descriptive of the area 610 and/or of the landmarks 608a-d in one or more transmissions 656a-c to the first drone 608a. The transmissions 656a-c may be conducted periodically, for example, and/or may be conducted upon occurrence of a triggering event, such as a request from the primary drone 608a, a passing of a data capacity threshold of the second drone 608b, and/or detection of a sensor reading above or below a predefined threshold (e.g., a high radiation level, a low temperature, etc.). In some embodiments, the transmissions 656a-c may be planned in accordance with the flight plan 652a-b and/or location or positioning of the second drone 606b (and/or the first drone 608a and/or the relative positioning therebetween). In some embodiments, a transmission 656a-c may be conducted (or attempted) upon a conclusion of a data capture event and/or sequence. As depicted in FIG. 6, for example, a first transmission 656a may be conducted by the second drone 608b at (or proximate to) the first time "T1", a second transmission 656b may be conducted at the second time "T2", and/or a third transmission 656c may be conducted at the third time "T3".

According to some embodiments, the first drone 606a may receive one or more of the transmissions 656a-c from the second drone 606b and may utilize the captured data, including data descriptive of the landmarks 608a-d, to generate the map/model 644 of the area 610. In some embodiments, data descriptive of the map/model 644 may be utilized to navigate the second drone 606b to new positions along the flight path 652a-b and/or to define the flight path 652a-b. In some embodiments, the first drone 606a may continue to receive captured data from the second drone 606b and may continue to update and/or generate the map/model 644 based on the received data. According to some embodiments, the first drone 606a may transmit the map/model 644 to a device (not shown) remote from the hazard area 610 and/or may navigate away from the hazard area 610 once the autonomous data collection routine is complete, e.g., to physically deliver the stored map/model 644 to a user (not shown) disposed in a safe area. In some embodiments, the second drone 608b may be expendable and may not need to return from the hazard area 610 with the first drone 608a.

Fewer or more components 606a-b, 608a-d, 610, 640, 644, 652a-b, 656a-b and/or various configurations of the depicted components 606a-b, 608a-d, 610, 640, 644, 652a-b, 656a-c may be included in the system 600 without deviating from the scope of embodiments described herein. In some embodiments, the components 606a-b, 608a-d, 610, 640, 644, 652a-b, 656a-c may be similar in configuration and/or functionality to similarly named and/or numbered components as described herein. In some embodiments, the system 600 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

Figure 7:
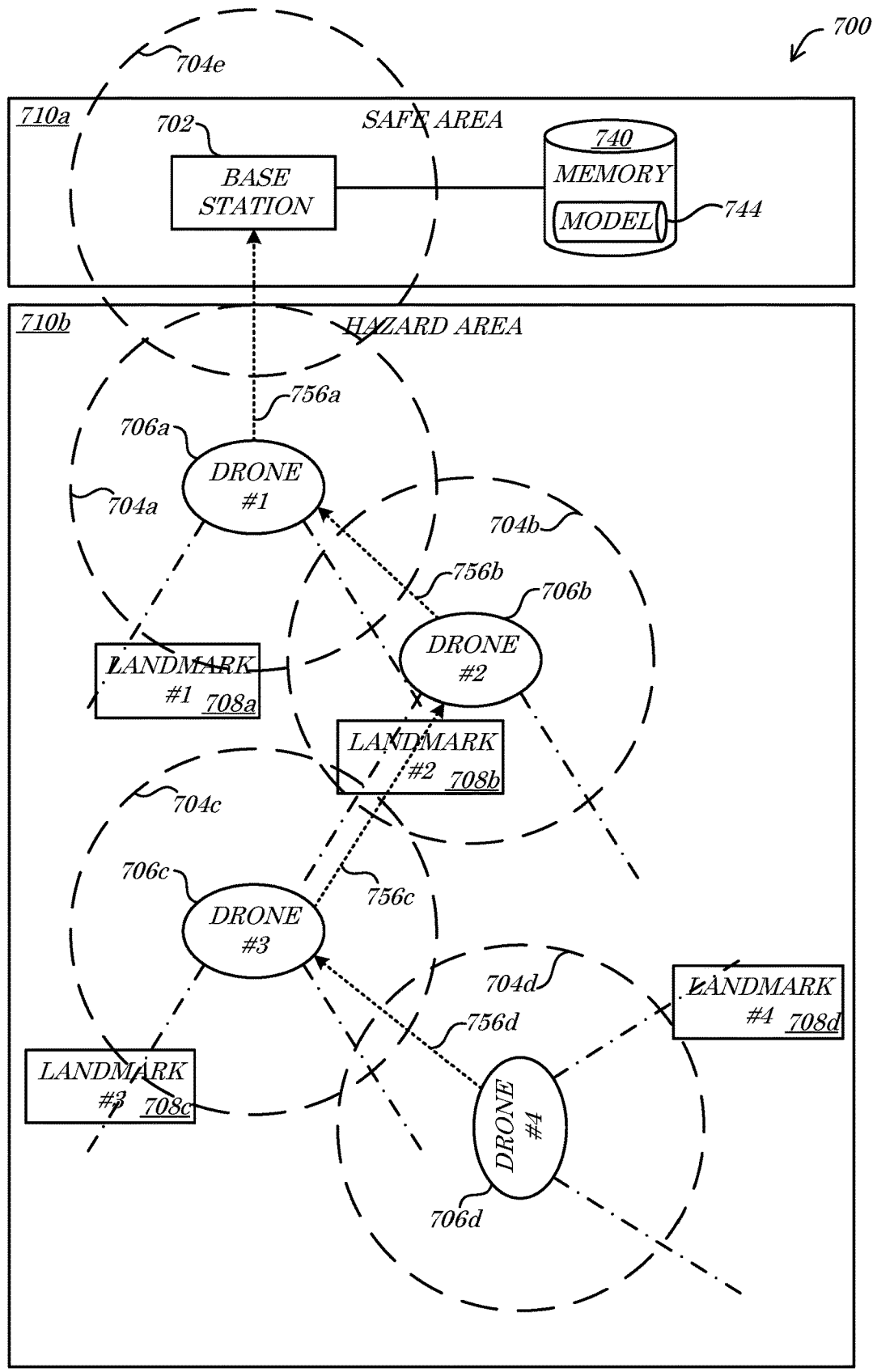
FIG. 7 is a block diagram of a system according to some embodiments.

Turning now to FIG. 7, a block diagram of system 700 according to some embodiments, is shown. In some embodiments, the system 700 may comprise a base station 702, a plurality of network and/or communication ranges 704a-e, and/or a plurality of drones 706a-d. According to some embodiments, the base station 702 may deploy the drones 706a-d to acquire data descriptive of a plurality of landmarks 708a-d. In some embodiments, the base station 702 may be disposed in a safe area 710a and/or the plurality of landmarks 708a-d and/or the drones 706a-d may be disposed in (and/or deployed to) a hazard area 710b. The drones 706a-d may be deployed, for example, to capture imagery (and/or other data) descriptive of a plurality of objects or landmarks 708a-d disposed in the hazard area 710b (and/or of the hazard area 710b itself). Each landmark 708a-d may comprise, for example, various architectural features, obstacles, and/or items disposed in a building (not explicitly shown) into which the drones 706a-d have been sent to autonomously acquire data. According to some embodiments, the base station 702 may comprise and/or be in communication with a memory 740 (e.g., storing a model 744). In some embodiments, the drones 706a-d may comprise one or more sensors (not separately shown) having respective fields of view as indicated by the dashed lines in FIG. 7.

According to some embodiments, the system 700 may be utilized to employ the base station 702 in the safe area 710a, while the drones 706a-d are cooperatively deployed into the hazard area 710b. In some embodiments, the drones 706a-d may capture data as described herein (e.g., mapping, sample, hazard, and/or damage data) and transmit the data back to the base station 702. The base station 702 may, for example, aggregate, add, and/or otherwise combine the received data to generate and/or calculate the model 744. According to some embodiments, the model 744 may be utilized to direct the drones 706a-d throughout the hazard area 710b. Each drone 706a-d may execute a navigational routine, for example, such that the cooperating drones 706a-d collect data descriptive of the entire hazard area 710b and transmit the data to the base station 702.

In some embodiments, such as depicted in FIG. 7, one or more of the drones 706a-d may not be in range to communicate wirelessly with the base station 702 directly. Each of the base station 702 and the drones 706a-d may comprise and/or define a respective wireless communication range 704a-e, for example, and a first drone 706a may comprise a first range 704a that overlaps with a base station range 706e of the base station 702. Each of a second drone 706b comprising a second range 704b, a third drone 706c comprising a third range 704c, and a fourth drone 706d comprising a fourth range 704d, may however be outside of the base station range 704e.

According to some embodiments, the second, third, and fourth drones 706b-d may cooperatively pass data to the base station 702 via the first drone 706a. The fourth drone 706d may capture data descriptive of a fourth landmark 708d and send a fourth signal 756d, for example, to the third drone 706c. The fourth signal 756d may comprise indications of the data descriptive of the fourth landmark 708d, a fourth portion or sub-area of the hazard area 710b, and/or hazard, sample, and/or damage data as captured by the sensor(s) of the fourth drone 706d. In some embodiments, the third drone 706c may capture data descriptive of a third landmark 708c and send a third signal 756c to the second drone 706b. The third signal 756c may comprise indications of the data descriptive of the third and fourth landmarks 708c-d, a third portion or sub-area of the hazard area 710b, and/or hazard, sample, and/or damage data as captured by the sensor(s) of the third drone 706c, along with any data received from the fourth drone 706d. In some embodiments, the second drone 706b may capture data descriptive of a second landmark 708b and send a second signal 756b to the first drone 706a. The second signal 756b may comprise indications of the data descriptive of the second, third, and fourth landmarks 708b-d, a second portion or sub-area of the hazard area 710b, and/or hazard, sample, and/or damage data as captured by the sensor(s) of the second drone 706b, along with any data received from the third and/or fourth drones 706c-d.

According to some embodiments, the first drone 706a may capture data descriptive of a first landmark 708a and send a first signal 756a to the base station 702. The first signal 756a may comprise indications of the data descriptive of the first, second, third, and fourth landmarks 708a-d, a first portion or sub-area of the hazard area 710b, and/or hazard, sample, and/or damage data as captured by the sensor(s) of the first drone 706a, along with any data received from the second, third, and fourth drones 706b-d. In such a manner, for example, the drones 706a-d may cooperatively daisy-chain their communication ranges 704a-d to upload collected data to the base station 702. According to some embodiments, such as in the embodiments described herein where a drone 706a-d may return to within a communication range (e.g., the base station range 704e) to upload data, one or more of the drones 706a-d may instead navigate to within range of a different drone 706a-d to pass the data in steps to the base station 702. In some embodiments, the base station 702 may process the received data to generate the model 744.

Fewer or more components 702, 704a-e, 706a-d, 708a-d, 710a-b, 740, 744, 756a-d and/or various configurations of the depicted components 702, 704a-e, 706a-d, 708a-d, 710a-b, 740, 744, 756a-d may be included in the system 700 without deviating from the scope of embodiments described herein. In some embodiments, the components 702, 704a-e, 706a-d, 708a-d, 710a-b, 740, 744, 756a-d may be similar in configuration and/or functionality to similarly named and/or numbered components as described herein. In some embodiments, the system 700 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

Figure 8:
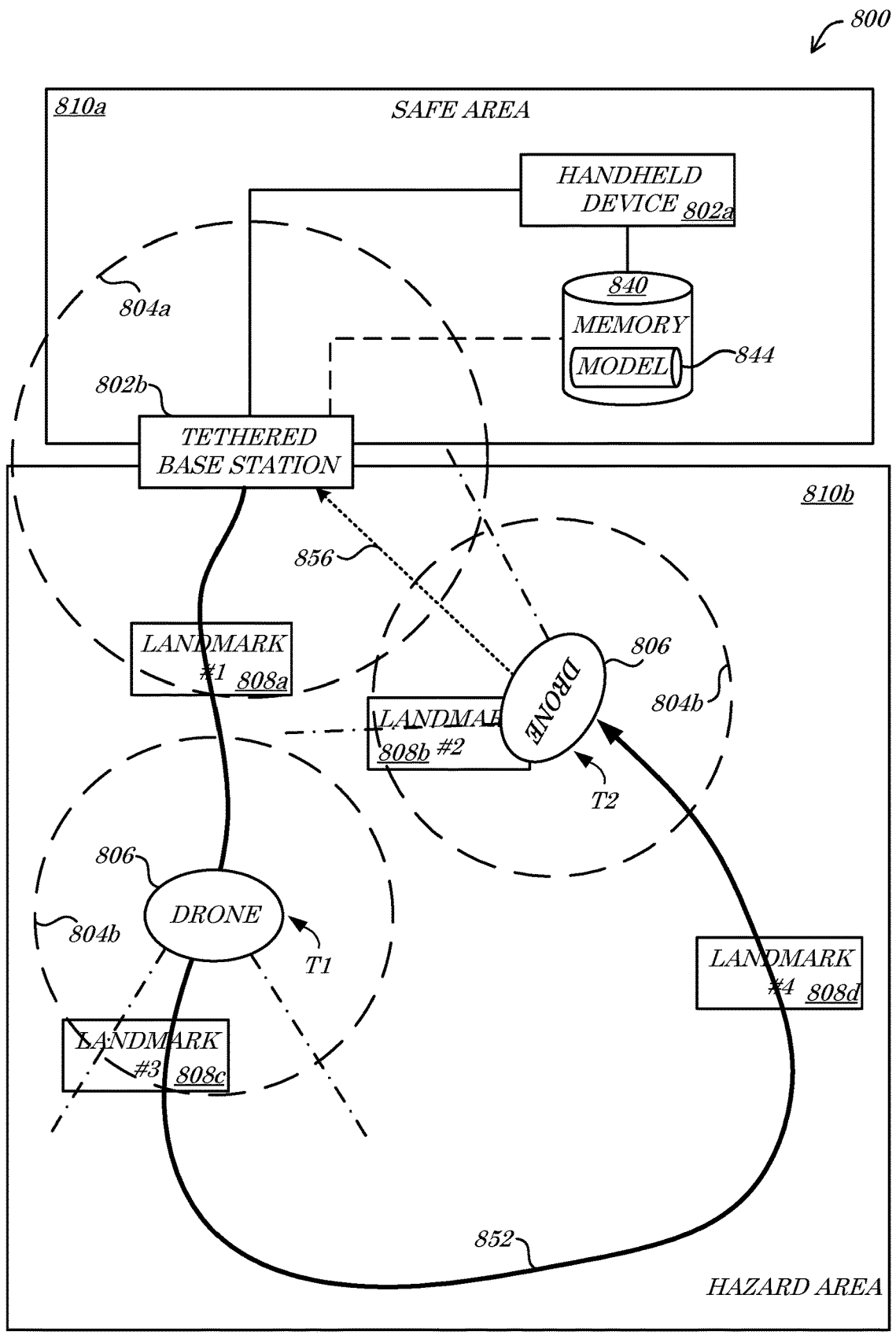
FIG. 8 is a block diagram of a system according to some embodiments.

Referring now to FIG. 8, a block diagram of system 800 according to some embodiments, is shown. In some embodiments, the system 800 may comprise a handheld device 802a coupled to a tethered base station 802b, a plurality of network and/or communication ranges 804a-b, and/or at least one drone 806. According to some embodiments, the handheld device 802a and/or the tethered base station 802b may deploy the drone 806 to acquire data descriptive of a plurality of landmarks 808a-d. In some embodiments, the handheld device 802a and/or the tethered base station 802b may be disposed in a safe area 810a and/or the plurality of landmarks 808a-d and/or the drone 806 may be disposed in (and/or deployed to) a hazard area 810b. The drone 806 may be deployed, for example, to capture imagery (and/or other data) descriptive of a plurality of objects or landmarks 808a-d disposed in the hazard area 810b (and/or of the hazard area 810b itself). Each landmark 808a-d may comprise, for example, various architectural features, obstacles, and/or items disposed in a building (not explicitly shown) into which the drone 806 (and/or the tethered base station 802b) has been sent to autonomously acquire data. According to some embodiments, the handheld device 802a (and/or the tethered base station 802b) may comprise and/or be in communication with a memory 840 (e.g., storing a model 844). In some embodiments, the drone 806 may comprise one or more sensors (not separately shown) having a respective field of view as indicated by the dashed lines in FIG. 8.

According to some embodiments, the system 800 may be utilized to employ the tethered base station 802b in the safe area 810a adjacent to the hazard area 810b or into the hazard area 810b. In some embodiments, the tethered drone 802b may be controlled by the handheld device 802a. In such a manner, for example, command and control capabilities of the handheld device 802a may be extended in range while increasing a safe operational distance between the handheld device 802a and the hazard area 810b. According to some embodiments, the drone 806 may navigate from a starting location, such as from the tethered base station 802b to a first location in the hazard area 810b at a first time "T1". In some embodiments, the drone 806 may navigate in accordance with a navigational route 852 to capture data descriptive of the landmarks 808a-d and the hazard area 810b. As depicted in FIG. 8, the drone 806 may navigate from the first location to a second location at a second time "T2". In some embodiments, the second location may comprise a location determined to be within operational communication range of the tethered base station 802b. At the second location, for example, a transmission range 804b of the drone 806 may coincide with and/or overlap with a reception range 804a of the tethered base station 802b, and a communication signal 856 may be sent from the drone 806 to the tethered base station 802b. The signal 856 may comprise an indication of captured data descriptive of the landmarks 808a-d and/or hazard, sample, and/or damage data as captured by the sensor(s) of the drone 806. In some embodiments, the tethered base station 802b may process the received data to generate the model 844 and/or may send the data to the handheld device 802a for processing.

Fewer or more components 802a-b, 804a-b, 806, 808a-d, 810a-b, 840, 844, 856 and/or various configurations of the depicted components 802a-b, 804a-b, 806, 808a-d, 810a-b, 840, 844, 856 may be included in the system 800 without deviating from the scope of embodiments described herein. In some embodiments, the components 802a-b, 804a-b, 806, 808a-d, 810a-b, 840, 844, 856 may be similar in configuration and/or functionality to similarly named and/or numbered components as described herein. In some embodiments, the system 800 (and/or portions thereof) may comprise an automatic, multi-object, hazardous location damage analysis program, system, and/or platform programmed and/or otherwise configured to execute, conduct, and/or facilitate the method 400 of FIG. 4 herein, and/or portions thereof.

V. Autonomous Hazardous Area Data Collection Interfaces

Figure 9:
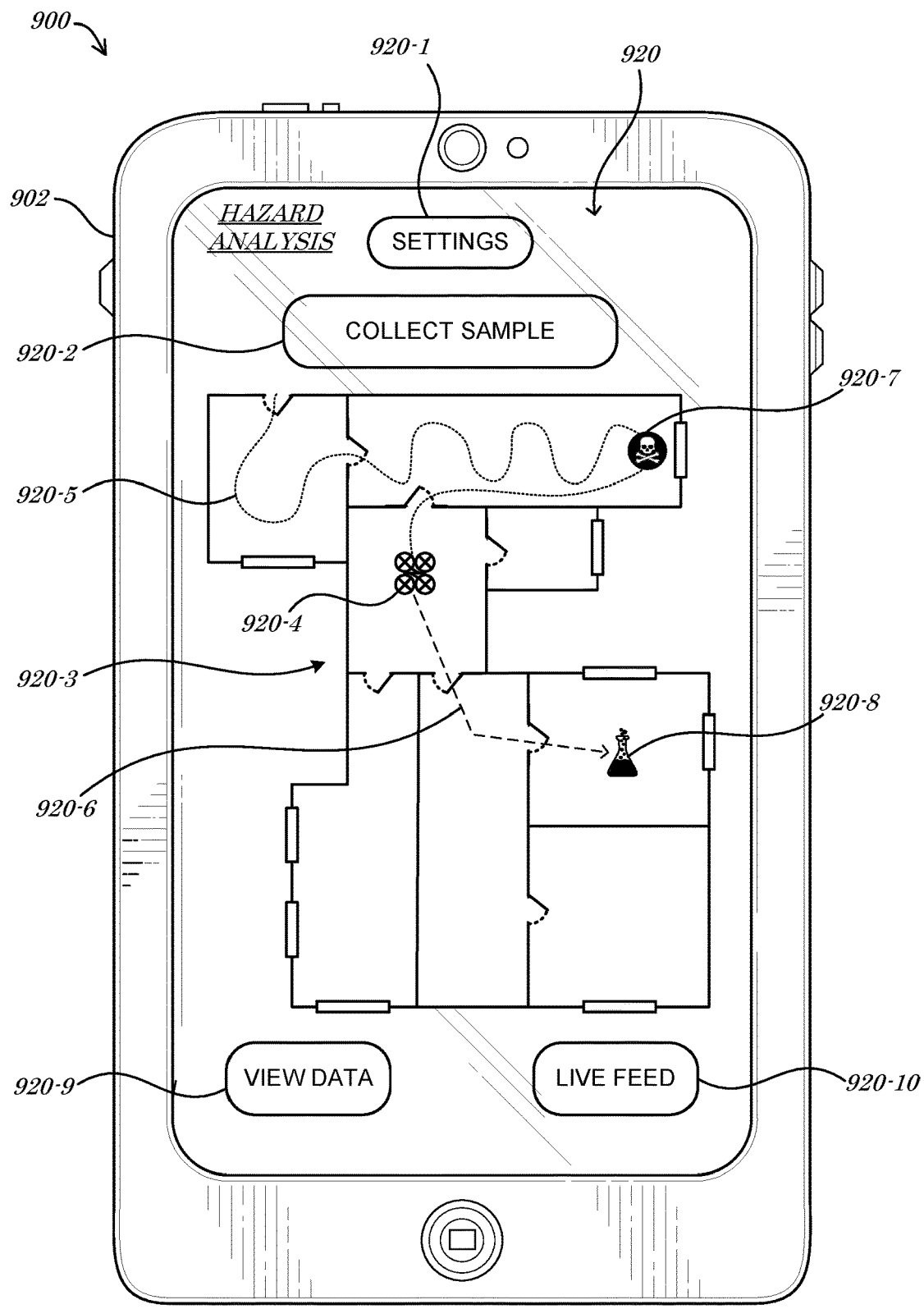
FIG. 9 is a diagram of a system according to some embodiments.

Turning now to FIG. 9, a diagram of a system 900 according to some embodiments is shown. In some embodiments, the system 900 may comprise a user device 902 which may, for example, be similar in configuration to one or more of the user/mobile electronic devices 102, 202, base station 302, and/or the autonomous vehicle/drone/aerial vehicle 106, 206, 306 of FIG. 1, FIG. 2, and/or FIG. 3 herein. According to some embodiments, the user device 902 may output an interface 920. The interface 920 may comprise a web page, web form, database entry form, API, spreadsheet, table, and/or application or other GUI by which a user or other entity may activate and/or utilize one or more autonomous vehicles to autonomously acquire and analyze hazard and/or damage estimation data for a given location (and/or for object at the location), as described herein. The interface 920 may, for example, comprise a front-end of an automatic, multi-object, hazardous location damage analysis program, system, and/or platform programmed and/or otherwise configured to execute, conduct, and/or facilitate the method 400 of FIG. 4 herein, and/or portions thereof.

According to some embodiments, the interface 920 may comprise one or more tabs and/or other segmented and/or logically presented data forms and/or fields. In some embodiments, the interface 920 may be configured and/or organized to allow and/or facilitate entry and/or acquisition of information regarding a potential hazard and/or loss event, location, and/or device or object associated with such an event and/or location. According to some embodiments, the interface 920 may comprise a menu page from which a user may select one or more options that initiate specific functionality of a mobile device application executed by the user device 902. As depicted in FIG. 9, for example, a version (or page or instance) of the interface 920 may comprise a "Hazard Analysis" interface (e.g., defining a first input and/or output mechanism) by providing an area (e.g., one or more data entry mechanisms, tools, objects, and/or features) that provides for selection/activation of (i) a "settings" button 920-1, (ii) a "collect sample" button 920-2, (iii) a hazardous area graphical representation 920-3 (e.g., a 2-D, 3-D, and/or other map or model output), (iv) a drone location icon/button 920-4, (v) a drone path history indicator 920-5, (vi) a drone path projection indicator 920-6, (vii) a hazard icon/button 920-7, (viii) a sample collection location icon/button 920-8, (ix) a "view data" button 920-9, and/or (x) a "live feed" button 920-10.

In some embodiments, the first version (or page or instance) of the interface 920 may be utilized to initiate an autonomous data collection routine of an autonomous vehicle, such as a drone (not shown; but represented by the drone location icon 920-4). The settings button 920-1 may, when actuated or selected by the user, for example, permit definition and/or editing of values that govern various settings and/or preferences, such as camera and/or sensor recording frequencies, resolutions, and/or exposure settings, insurance policy information, location information, contact information, autonomous vehicle parameters and/or information, and/or rules definitions. Rules definitions may comprise, for example, definitions for one or more rules that govern (i) data/imagery acquisition, (ii) navigational thresholds and/or rules, (iii) object (e.g., landmark) shape identification, (iv) text and/or visual identification data recognition, (v) damage shape identification, (vi) damage estimation, and/or (vii) claim handling (e.g., approve, deny, etc.).

According to some embodiments, the collect sample button 920-2 may, when actuated or selected by the user, initiate a sub-routine that commands the drone to collect a data sample. In some embodiments, the collect sample button 920-2 may cause the drone to navigate to a specific location identified by the user via the interface 920. The user may select one or more points/locations, such as the sample location identified or marked by the sample collection icon 920-8, in a specific room of a structure represented by the hazardous area graphical representation 920-3. According to some embodiments, the user may also or alternatively command the drone to drop off a sample collection device at one or more locations, retrieve a sample collection device, analyze a sample, and/or automatically deposit, collect, and/or analyze a given number of samples. In some embodiments, activation of the collect sample button 920-2 may cause an interruption to the autonomous navigation, data collection, and/or sampling of the drone. As depicted in FIG. 9, for example, the previous path of the drone as identified by the drone path history indicator 920-5 may have been conducted autonomously by the drone in accordance with a particular navigation and/or data collection pattern, while the drone path projection indication 920-6 shows a planned direct path to the sample location indicated by the sample collection location icon 920-8—e.g., due to the user's override that caused the drone to pause the data collection routine (or at least the routing thereof, for it may continue to gather data) to prioritize the sample collection.

In some embodiments, the hazardous area graphical representation 920-3 may comprise a graphical representation of an area to be analyzed. As depicted by the non-limiting example in FIG. 9, for example, the hazardous area graphical representation 920-3 comprises a 2-D graphical depiction of a floor plan or layout of a building. According to some embodiments, the hazardous area graphical representation 920-3 may be generated based on pre-stored data, such as blueprints or surveys obtained from a third-party (e.g., a client and/or municipality). In some embodiments, the hazardous area graphical representation 920-3 may be generated based on data received from the drone. The autonomous drone may map the area and transmit map and/or mathematical model data to the user device 902, for example, and the user device 902 may execute the stored autonomous data collection application to generate the interface 920 and the hazardous area graphical representation 920-3. While the hazardous area graphical representation 920-3 is depicted in FIG. 9 as a 2-D floor plan, various other types and/or configurations of hazardous area graphical representation 920-3 may be utilized, such as a 3-D graphical depiction or rendering, a chart, graph, etc.

According to some embodiments, the drone location icon/button 920-4 may comprise an indicator of a current location of the drone, e.g., at, in, or near the hazardous area. In some embodiments, the drone location icon/button 920-4 may comprise an interactive and/or selectable element of the interface 920. The user may select the drone location icon/button 920-4, for example, and the application may provide a second version of the interface 920 (not shown) that provides information relating to the drone such as altitude, coordinates of a current location, orientation, battery life and/or statistics or metrics, sensor readings, etc. According to some embodiments, the drone path history indicator 920-5 may comprise a visual indication of a path of travel taken by the drone through the area. In such a manner, for example, the user may readily discern whether the drone has adequately searched and/or mapped the area. In some embodiments, the drone path projection indicator 920-6 may comprise a graphical indication of an estimated or predicted path that the drone will take through the area. The drone path projection indicator 920-6 may, in some embodiments, be generated by the application based on data received from the drone, such as flight plan data and/or data identifying one or more waypoints and/or destinations in the area.

In some embodiments, the hazard icon/button 920-7 may comprise an indicator of a location in the area for which a sensor reading has been observed and/or recorded by the drone at or above a predetermined threshold value. In some embodiments, the hazard icon/button 920-7 may comprise an interactive and/or selectable element of the interface 920. The user may select the hazard icon/button 920-7, for example, and the application may provide a second version of the interface 920 (not shown) that provides information descriptive of the sensor reading at the location, such as a reading value, time of reading, type of reading, hazard assessment, warning, etc. In such a manner, for example, the drone may identify locations and/or objects in the hazardous area that may pose a risk or threat, and the user of the user device 902 may readily identify such locations by reference to the hazardous area graphical representation 920-3. In some embodiments, the hazard icon/button 920-7 may also or alternatively represent and be linked to data descriptive of damage, loss, repair, and/or other desired observances of the autonomous drone.

According to some embodiments, the sample collection location icon/button 920-8 may comprise an indicator of a location of a hazardous condition sample. The sample collection location icon/button 920-8 may represent, for example, a location at which the user desires a sample to be taken, a location at which the drone has already taken a sample, and/or a location at which the drone has deposited a sample collection device (e.g., for later pickup or remote sample reporting—e.g., a wireless carbon monoxide sensor). In some embodiments, the sample collection location icon/button 920-8 may comprise an interactive and/or selectable element of the interface 920. The user may select the sample collection location icon/button 920-8, for example, and the application may provide a second version of the interface 920 (not shown) that provides information descriptive of the sample location and/or an associated sample, such as sample type, time of deposit of sample collection device, time of retrieval of sample collection device, sample collection device readings and/or status, etc.

In some embodiments, the view data button 920-9 may, when actuated or selected by the user, for example, initiate a sub-routine that causes the application to provide a second version of the interface 920 (not shown) that provides information descriptive of any or all data captured and/or collected by the drone. The data may, for example, comprise raw or unprocessed data, such as distance measurements, coordinate readouts, sensor readings, etc. In some embodiments, the data may comprise data uploaded by the drone at different intervals during the autonomous data collection routine. According to some embodiments, the live feed button 920-10 may, when actuated or selected by the user, for example, initiate a sub-routine that causes the application to provide a second version of the interface 920 (not shown) that provides current data from the drone. The current data may comprise, for example, a live video feed from the drone, such that the user may view the conditions in the hazardous area. In some embodiments, the live feed data may also or alternatively comprise an ability of the user to interact with the surroundings of the drone. The user may provide input, such as voice commands or queries, for example, that may be output by the drone at the current location of the drone. In such a manner, for example, should the drone (and/or the user) identify a person in the hazardous area, the user may interact with the person by utilizing the drone as a remote intercom device.

While various components of the interface 920 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

VI. Autonomous Hazardous Area Data Collection Apparatus and Articles of Manufacture Turning to FIG. 10, a block diagram of an apparatus 1006 according to some embodiments is shown. In some embodiments, the apparatus 1006 may be similar in configuration and/or functionality to any of the mobile electronic devices/user devices 102, 202, 902, the base station 302, and/or the autonomous vehicle/drone/aerial vehicle 106, 206, 306 of FIG. 1, FIG. 2, FIG. 3, and/or FIG. 9 herein. The apparatus 1006 may, for example, execute, process, facilitate, and/or otherwise be associated with the method 400 of FIG. 4 herein, and/or portions thereof. In some embodiments, the apparatus 1006 may comprise a processing device 1012, a transceiver device 1014, an input device 1016, an output device 1018, an interface 1020, a memory device 1040 (storing various programs and/or instructions 1042 and data 1044), a cooling device 1050, a power device 1060, and/or a propulsion device 1070. According to some embodiments, any or all of the components 1012, 1014, 1016, 1018, 1020, 1040, 1042, 1044, 1050, 1060, 1070 of the apparatus 1006 may be similar in configuration and/or functionality to any similarly named and/or numbered components described herein. Fewer or more components 1012, 1014, 1016, 1018, 1020, 1040, 1042, 1044, 1050, 1060, 1070 and/or various configurations of the components 1012, 1014, 1016, 1018, 1020, 1040, 1042, 1044, 1050, 1060, 1070 may be included in the apparatus 1006 without deviating from the scope of embodiments described herein.

According to some embodiments, the processor 1012 may be or include any type, quantity, and/or configuration of processor that is or becomes known. The processor 1012 may comprise, for example, an Intel® IXP 2800 network processor or an Intel® XEON™ Processor coupled with an Intel® E7501 chipset. In some embodiments, the processor 1012 may comprise multiple inter-connected processors, microprocessors, and/or micro-engines. According to some embodiments, the processor 1012 (and/or the apparatus 1006 and/or other components thereof) may be supplied power via the power device 1060, such as a battery, an Alternating Current (AC) source, a Direct Current (DC) source, an AC/DC adapter, solar cells, and/or an inertial generator. In the case that the apparatus 1006 comprises a server, such as a blade server, the power device 1060 may comprise and/or necessary power may be supplied via a standard AC outlet, power strip, surge protector, and/or Uninterruptible Power Supply (UPS) device. In the case that the apparatus 1006 comprises an aerial vehicle, drone, and/or other autonomous vehicle, the power device 1060 may comprise and/or necessary power may be supplied via one or more lithium-ion batteries and/or battery packs comprising lithium polymer (e.g., lithium cobalt oxide (Li-$CoO_2$), lithium iron phosphate (Li$FePO_4$), lithium ion manganese oxide (Li$Mn_2O_4$), and/or lithium nickel manganese cobalt oxide (LiNiMnCo$O_2$) batteries).

In some embodiments, the transceiver device 1014 may comprise any type or configuration of electronic communication device that is or becomes known or practicable. The transceiver device 1014 may, for example, comprise a Network Interface Card (NIC), a telephonic device, a cellular network device, a router, a hub, a modem, and/or a communications port or cable. In some embodiments, the transceiver device 1014 may be coupled to transmit commands or other data to or from one or more autonomous vehicles (not separately shown) and/or receive and/or transmit data and/or imagery of a location for which insurance claims analysis of possible damage and/or hazardous conditions is desired. The transceiver device 1014 may, for example, comprise a BLE, Wi-Fi®, and/or RF transceiver device that acquires imagery data and transmits such data and/or other data, such as 3-D maps/models, to a remote server or user device (not shown), e.g., for analysis and/or output to a user. According to some embodiments, the transceiver device 1014 may also or alternatively be coupled to the processor 1012. In some embodiments, the transceiver device 1014 may comprise an IR, RF, Bluetooth™, Near-Field Communication (NFC), and/or Wi-Fi® network device coupled to facilitate communications between the processor 1012 and another device (such as a remote user device, not shown in FIG. 10).

In some embodiments, the input device 1016 and/or the output device 1018 are communicatively coupled to the processor 1012 (e.g., via wired and/or wireless connections and/or pathways) and they may generally comprise any types or configurations of input and output components and/or devices that are or become known, respectively. The input device 1016 may comprise, for example, a sensor, such as a receiver, a camera, a proximity sensor, a vehicle device status sensor, a signal strength meter, etc. The output device 1018 may, according to some embodiments, comprise a display screen and/or other practicable output component and/or device. The output device 1018 may, for example, provide and/or cause a generation of the interface 1020 (such as the interfaces 220, 920 of FIG. 2 and/or FIG. 9 herein) via which automatic damage detection, verification, and/or analysis data is provided to a user (e.g., via a website and/or mobile application). According to some embodiments, the input device 1016 and/or the output device 1018 may comprise and/or be embodied in a single device, such as a touch-screen monitor.

The memory device 1040 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1040 may, according to some embodiments, store one or more of data collection instructions 1042-1, AI image processing instructions 1042-2, mapping instructions 1042-3, damage estimation instructions 1042-4, location computation instructions 1042-5, interface instructions 1042-6, location data 1044-1, sensor data 1044-2, map data 1044-3, sample data 1044-4, and/or damage data 1044-5. In some embodiments, the data collection instructions 1042-1, the AI image processing instructions 1042-2, the mapping instructions 1042-3, the damage estimation instructions 1042-4, the location computation instructions 1042-5, and/or the interface instructions 1042-6 may be utilized by the processor 1012 to provide output information via the output device 1018 and/or the transceiver device 1014.

According to some embodiments, the data collection instructions 1042-1 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the data collection instructions 1042-1. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the data collection instructions 1042-1 to conduct autonomous navigation, data collection, and analysis/mapping, as described herein.

In some embodiments, the AI image processing instructions 1042-2 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the AI image processing instructions 1042-2. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the AI image processing instructions 1042-2 to identify a type, category, characterization, location, and/or grouping for each identified discrete object/landmark at the target location, as described herein.

According to some embodiments, the mapping instructions 1042-3 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the mapping instructions 1042-3. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the mapping instructions 1042-3 to generate a map and/or model descriptive of the target location and/or landmarks/objects therein, as described herein.

In some embodiments, the damage estimation instructions 1042-4 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the damage estimation instructions 1042-4. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the damage estimation instructions 1042-4 to identify areas of damage to the target location and/or to one or more discrete objects/landmarks identified at the location, calculate an estimated amount of damage for each occurrence/object, calculate a total amount of estimated damage (e.g., in dollars) for the location (e.g., a summation of damage estimates for all discrete objects/occurrences at the location), and/or calculate an amount payable in response to an insurance claim submission (e.g., compute a determination as to whether, or how much, of an insurance claim for the location should be paid), as described herein.

According to some embodiments, the location computation instructions 1042-5 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the location computation instructions 1042-5. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the location computation instructions 1042-5 to identify (e.g., calculate) a current location of an autonomous vehicle, as described herein.

In some embodiments, the interface instructions 1042-6 may be operable to cause the processor 1012 to process the location data 1044-1, sensor data 1044-2, map data 1044-3, sample data 1044-4, and/or damage data 1044-5 in accordance with embodiments as described herein. Location data 1044-1, sensor data 1044-2, map data 1044-3, sample data 1044-4, and/or damage data 1044-5 received via the input device 1016 and/or the transceiver device 1014 may, for example, be analyzed, sorted, filtered, decoded, decompressed, ranked, scored, plotted, and/or otherwise processed by the processor 1012 in accordance with the interface instructions 1042-6. In some embodiments, location data 1044-1, sensor data 1044-2, map data 1044-3, sample data 1044-4, and/or damage data 1044-5 may be fed by the processor 1012 through one or more mathematical and/or statistical formulas and/or models in accordance with the interface instructions 1042-6 to provide the interface 1020 (e.g., such as the interface 220, 920 of FIG. 2 and/or FIG. 9 herein) via which input and/or output descriptive of a damage/loss event, location, object, and/or result may be captured and/or provided, as described herein.

According to some embodiments, the apparatus 1006 may comprise the cooling device 1050. According to some embodiments, the cooling device 1050 may be coupled (physically, thermally, and/or electrically) to the processor 1012, the memory device 1040, the power device 1060, and/or the propulsion device 1070. The cooling device 1050 may, for example, comprise a fan, heat sink, heat pipe, radiator, cold plate, and/or other cooling component or device or combinations thereof, configured to remove heat from portions or components of the apparatus 1006.

In some embodiments, the propulsion device 1070 may comprise any type, quantity, and/or configuration of devices that are operable to impart motion and/or directional motion to the apparatus 1006 (or a portion thereof). In the case that the apparatus 1006 comprises an autonomous vehicle, for example, the propulsion device 1070 may comprise one or more of an electric motor, a gas engine, a compressor, decompressor, valve, spring, tire or wheel, a track, a propeller, a control surface, nozzle, fan, solid or liquid fuel rocket, and/or magnetic propulsion device.

Any or all of the exemplary instructions and data types described herein and other practicable types of data may be stored in any number, type, and/or configuration of memory devices that is or becomes known. The memory device 1040 may, for example, comprise one or more data tables or files, databases, table spaces, registers, and/or other storage structures. In some embodiments, multiple databases and/or storage structures (and/or multiple memory devices 1040) may be utilized to store information associated with the apparatus 1006. According to some embodiments, the memory device 1040 may be incorporated into and/or otherwise coupled to the apparatus 1006 (e.g., as shown) or may simply be accessible to the apparatus 1006 (e.g., externally located and/or situated).

Referring to FIG. 11A, FIG. 11B, FIG. 11C, FIG. 11D, and FIG. 11E, perspective diagrams of exemplary data storage devices 1140*a-e* according to some embodiments are shown. The data storage devices 1140*a-e* may, for example, be utilized to store instructions and/or data, such as the data collection instructions 1042-1, AI image processing instructions 1042-2, mapping instructions 1042-3, damage estimation instructions 1042-4, location computation instructions 1042-5, interface instructions 1042-6, location data 1044-1, sensor data 1044-2, map data 1044-3, sample data 1044-4, and/or damage data 1044-5, each of which is presented in reference to FIG. 10 herein. In some embodiments, instructions stored on the data storage devices 1140*a-e* may, when executed by a processor, cause the implementation of and/or facilitate the method 400 of FIG. 4 herein, and/or portions thereof.

According to some embodiments, the first data storage device 1140*a* may comprise one or more various types of internal and/or external hard drives. The first data storage device 1140*a* may, for example, comprise a data storage medium 1146 that is read, interrogated, and/or otherwise communicatively coupled to and/or via a disk reading device 1148. In some embodiments, the first data storage device 1140*a* and/or the data storage medium 1146 may be configured to store information utilizing one or more magnetic, inductive, and/or optical means (e.g., magnetic, inductive, and/or optical-encoding). The data storage medium 1146, depicted as a first data storage medium 1146*a* for example (e.g., breakout cross-section "A"), may comprise one or more of a polymer layer 1146*a*-1, a magnetic data storage layer 1146*a*-2, a non-magnetic layer 1146*a*-3, a magnetic base layer 1146*a*-4, a contact layer 1146*a*-5, and/or a substrate layer 1146*a*-6. According to some embodiments, a magnetic read head 1148*a* may be coupled and/or disposed to read data from the magnetic data storage layer 1146*a*-2.

In some embodiments, the data storage medium 1146, depicted as a second data storage medium 1146*b* for example (e.g., breakout cross-section "B"), may comprise a plurality of data points 1146*b*-2 disposed with the second data storage medium 1146*b*. The data points 1146*b*-2 may, in some embodiments, be read and/or otherwise interfaced with via a laser-enabled read head 1148*b* disposed and/or coupled to direct a laser beam through the second data storage medium 1146*b*.

In some embodiments, the second data storage device 1140*b* may comprise a CD, CD-ROM, DVD, Blu-Ray™ Disc, and/or other type of optically-encoded disk and/or other storage medium that is or becomes know or practicable. In some embodiments, the third data storage device 1140*c* may comprise a USB keyfob, dongle, and/or other type of flash memory data storage device that is or becomes know or practicable. In some embodiments, the fourth data storage device 1140*d* may comprise RAM of any type, quantity, and/or configuration that is or becomes practicable and/or desirable. In some embodiments, the fourth data storage device 1140*d* may comprise an off-chip cache such as a Level 2 (L2) cache memory device. According to some embodiments, the fifth data storage device 1140*e* may comprise an on-chip memory device such as a Level 1 (L1) cache memory device.

The data storage devices 1140*a-e* may generally store program instructions, code, and/or modules that, when executed by a processing device cause a particular machine to function in accordance with one or more embodiments described herein. The data storage devices 1140*a-e* depicted in FIG. 11A, FIG. 11B, FIG. 11C, FIG. 11D, and FIG. 11E are representative of a class and/or subset of computer-readable media that are defined herein as "computer-readable memory" (e.g., non-transitory memory devices as opposed to transmission devices or media).

VII. Terms and Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with an "AI module" or a "module". As used herein, the term "module" may generally refer to a combination of specially-coded instructions stored on a non-transitory data storage medium and executed by a specific set of hardware and/or firmware components comprising at least one electronic processing device in communication with the non-transitory data storage medium. In some embodiments, components of a module may be mutually exclusive. According to some embodiments, components may be shared and/or replicated amongst different modules (e.g., a single processing unit may execute multiple sets of specially-programmed instructions stored on one or more non-transitory data storage medium instances). An "AI module" may comprise a type of module that includes machine-learning instructions directed to performing one or more particular tasks. In some embodiments, an AI module may comprise a set of specially-programmed instructions that are coded to interact by accepting at least one input, processing the input in accordance with one or more stored rules, providing at least one output based on an application of the one or more stored rules to the at least one input, and adjusting the one or more stored rules (or a subset thereof) based on the at least one output.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a PDA, a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

VIII. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A low-cost, GPS-denied drone programmed for autonomous hazardous area data collection, comprising:
   (i) a propulsion device,
   (ii) an imaging device,
   (iii) an electronic processing unit, and
   (iv) a non-transitory memory device in communication with the electronic processing unit, wherein the non-transitory memory device stores instructions that define (a) a hazardous area data collection routine, (b) an AI image processing routine, (c) a three-dimensional mapping routine, and (d) a non-GPS locational computation routine, that when executed by the electronic processing unit, result in:
   identifying known location data for a starting position of the hazardous area data collection routine, the known location data defining a first location;
   acquiring, in response to an initiation of the hazardous area data collection routine by the electronic processing unit and utilizing the imaging device at the first location and at an initiation time, data descriptive of the first location;
   identifying, by the electronic processing unit and utilizing the AI image processing routine to process the data descriptive of the first location, locations of a first plurality of landmarks in relation to the first location;
   generating, by an execution of the three-dimensional mapping routine by the electronic processing unit and based on the identified locations of the first plurality of landmarks, a three-dimensional map descriptive of an area in which the GPS-denied drone is disposed;
   navigating throughout the area in which the GPS-denied drone is disposed, wherein the navigating comprises:
   (1) activating, by the GPS-denied drone and in response to an execution of the hazardous area data collection routine by the electronic processing unit, the propulsion device and thereby moving the GPS-denied drone from the first location to a new location;
   (2) acquiring, in response to the execution of the hazardous area data collection routine by the electronic processing unit and utilizing the imaging device at the new location and at a new time, data descriptive of the new location;
   (3) identifying, by the electronic processing unit and utilizing the AI image processing routine to process the data descriptive of the new location, locations of a new plurality of landmarks in relation to the new location;
   (4) generating, by an execution of the three-dimensional mapping routine by the electronic processing unit and based on the identified locations of the new plurality of landmarks, an updated three-dimensional map descriptive of the area in which the GPS-denied drone is disposed;
   (5) computing, by an execution of the non-GPS locational computation routine by the electronic processing unit and based on a comparison of the locations of the first plurality of landmarks and the locations of the new plurality of landmarks, a location of the GPS-denied drone on the updated three-dimensional map; and
   (6) repeating steps (1) through (5) until a triggering event is identified.

2. The low-cost, GPS-denied drone programmed for autonomous hazardous area data collection, of claim 1, further comprising (v) a wireless transmitter device, and wherein the instructions, when executed by the electronic processing unit, further result in:
   identifying, in response to the execution of the hazardous area data collection routine by the electronic processing unit, the triggering event;
   identifying, by the electronic processing unit, that a base station is not within transmission range of the wireless transmitter device;
   repositioning the GPS-denied drone within the area in which the GPS-denied drone is disposed, utilizing the updated three-dimensional map to navigate to a location that is closer to the base station, wherein the repositioning comprises:
   activating, by the GPS-denied drone and in response to the identifying that the base station is not within transmission range of the wireless transmitter device, the propulsion device and thereby moving the GPS-denied drone from a current location to a location that is closer to the base station; and
   transmitting, from the closer location and to the base station, and utilizing the wireless transmitter device, data defining the updated three-dimensional map.

3. The low-cost, GPS-denied drone programmed for autonomous hazardous area data collection, of claim 2, wherein the identifying that the base station is not within transmission range of the wireless transmitter device, comprises:
   calculating, by the electronic processing unit and utilizing a current location of the GPS-denied drone on the updated three-dimensional map and stored location information descriptive of a location of the base station, a distance to the location of the base station; and
   identifying, by the electronic processing unit and by comparing the calculated distance to the location of the base station with signal range information for the wireless transmitter device, that the base station is not within transmission range of the wireless transmitter device.

4. The low-cost, GPS-denied drone programmed for autonomous hazardous area data collection, of claim 2, wherein the identifying that the base station is not within transmission range of the wireless transmitter device, comprises:
   identifying, by the electronic processing unit, that a signal from the base station has not been received within a predetermined time period.

5. The low-cost, GPS-denied drone programmed for autonomous hazardous area data collection, of claim 2, wherein the identifying that the base station is not within transmission range of the wireless transmitter device, comprises:
   transmitting, to the base station and utilizing the wireless transmitter device, a communications check signal; and
   identifying, by the electronic processing unit and in response to the transmitting of the communications check signal, that a response signal from the base station has not been received within a predetermined time period.

6. The low-cost, GPS-denied drone programmed for autonomous hazardous area data collection, of claim 2, further comprising:
(vi) a sensor in communication with the electronic processing unit, and
wherein the hazardous area data collection routine comprises instructions that when executed by the electronic processing unit, result in:
collecting, utilizing the sensor during the navigating, a sensor reading at a plurality of locations in the area in which the GPS-denied drone is disposed, wherein each sensor reading is descriptive of the location at which it is collected; and
correlating each sensor reading with a respective location on the updated three-dimensional map.

7. The low-cost, GPS-denied drone programmed for autonomous hazardous area data collection, of claim 6, wherein the transmitting further comprises transmitting data defining the sensor readings and their respective locations on the updated three-dimensional map.

8. The low-cost, GPS-denied drone programmed for autonomous hazardous area data collection, of claim 1, wherein the triggering event comprises one or more of: (i) an indication that a predefined minimum data storage capacity has been reached in the non-transitory memory device and (ii) an indication that a predefined minimum power level has been reached in a battery of the GPS-denied drone.

9. The low-cost, GPS-denied drone programmed for autonomous hazardous area data collection, of claim 1, wherein the GPS-denied drone comprises a first autonomous vehicle, and wherein the base station comprises a second autonomous vehicle.

10. The low-cost, GPS-denied drone programmed for autonomous hazardous area data collection, of claim 1, wherein the base station comprises a ground vehicle tethered to a control station.

11. A method for operating a low-cost, GPS-denied drone programmed for autonomous hazardous area data collection, comprising:
identifying known location data for a starting position of a hazardous area data collection routine, the known location data defining a first location, and the hazardous area data collection routine being stored by a non-transitory memory device of the GPS-denied drone, and the non-transitory memory device being in communication with an electronic processing unit of the GPS-denied drone;
acquiring, in response to an initiation of the hazardous area data collection routine by the electronic processing unit and utilizing an imaging device of the GPS-denied drone, at the first location and at an initiation time, data descriptive of the first location;
identifying, by an execution of an AI image processing routine stored by the non-transitory memory device, by the electronic processing unit and to process the data descriptive of the first location, locations of a first plurality of landmarks in relation to the first location;
generating, by an execution of a three-dimensional mapping routine stored by the non-transitory memory device, by the electronic processing unit and based on the identified locations of the first plurality of landmarks, a three-dimensional map descriptive of an area in which the GPS-denied drone is disposed;
navigating throughout the area in which the GPS-denied drone is disposed, wherein the navigating comprises:
(1) activating, by the GPS-denied drone and in response to an execution of the hazardous area data collection routine by the electronic processing unit, a propulsion device of the GPS-denied drone, and thereby moving the GPS-denied drone from the first location to a new location;
(2) acquiring, in response to the execution of the hazardous area data collection routine by the electronic processing unit and utilizing the imaging device at the new location and at a new time, data descriptive of the new location;
(3) identifying, by the electronic processing unit and utilizing the AI image processing routine to process the data descriptive of the new location, locations of a new plurality of landmarks in relation to the new location;
(4) generating, by an execution of the three-dimensional mapping routine by the electronic processing unit and based on the identified locations of the new plurality of landmarks, an updated three-dimensional map descriptive of the area in which the GPS-denied drone is disposed;
(5) computing, by an execution of a non-GPS locational computation routine stored by the non-transitory memory device, by the electronic processing unit and based on a comparison of the locations of the first plurality of landmarks and the locations of the new plurality of landmarks, a location of the GPS-denied drone on the updated three-dimensional map; and
(6) repeating steps (1) through (5) until a triggering event is identified.

12. The method of operating the low-cost, GPS-denied drone programmed for autonomous hazardous area data collection, of claim 11, further comprising:
identifying, in response to the execution of the hazardous area data collection routine by the electronic processing unit, the triggering event;
identifying, by the electronic processing unit, that a base station is not within transmission range of a wireless transmitter device of the GPS-denied drone; and
repositioning the GPS-denied drone within the area in which the GPS-denied drone is disposed, utilizing the updated three-dimensional map to navigate to a location that is closer to the base station, wherein the repositioning comprises:
activating, by the GPS-denied drone and in response to the identifying that the base station is not within transmission range of the wireless transmitter device, the propulsion device and thereby moving the GPS-denied drone from a current location to a location that is closer to the base station; and
transmitting, from the closer location and to the base station, and utilizing the wireless transmitter device, data defining the updated three-dimensional map.

13. The method of operating the low-cost, GPS-denied drone programmed for autonomous hazardous area data collection, of claim 12, wherein the identifying that the base station is not within transmission range of the wireless transmitter device, comprises:
calculating, by the electronic processing unit and utilizing a current location of the GPS-denied drone on the updated three-dimensional map and stored location information descriptive of a location of the base station, a distance to the location of the base station; and identifying, by the electronic processing unit and by comparing the calculated distance to the location of the base station with signal range information for the wireless transmitter device, that the base station is not within transmission range of the wireless transmitter device.

14. The method of operating the low-cost, GPS-denied drone programmed for autonomous hazardous area data collection, of claim 12, wherein the identifying that the base station is not within transmission range of the wireless transmitter device, comprises:
identifying, by the electronic processing unit, that a signal from the base station has not been received within a predetermined time period.

15. The method of operating the low-cost, GPS-denied drone programmed for autonomous hazardous area data collection, of claim 12, wherein the identifying that the base station is not within transmission range of the wireless transmitter device, comprises:
transmitting, to the base station and utilizing the wireless transmitter device, a communications check signal; and
identifying, by the electronic processing unit and in response to the transmitting of the communications check signal, that a response signal from the base station has not been received within a predetermined time period.

16. The method of operating the low-cost, GPS-denied drone programmed for autonomous hazardous area data collection, of claim 12, wherein the GPS-denied drone further comprises a sensor in communication with the electronic processing unit, further comprising:
collecting, utilizing the sensor during the navigating, a sensor reading at a plurality of locations in the area in which the GPS-denied drone is disposed, wherein each sensor reading is descriptive of the location at which it is collected; and
correlating each sensor reading with a respective location on the updated three-dimensional map.

17. The method of operating the low-cost, GPS-denied drone programmed for autonomous hazardous area data collection, of claim 16, wherein the transmitting further comprises transmitting data defining the sensor readings and their respective locations on the updated three-dimensional map.

18. The method of operating the low-cost, GPS-denied drone programmed for autonomous hazardous area data collection, of claim 11, wherein the triggering event comprises one or more of: (i) an indication that a predefined minimum data storage capacity has been reached in the non-transitory memory device and (ii) an indication that a predefined minimum power level has been reached in a battery of the GPS-denied drone.

19. The method of operating the low-cost, GPS-denied drone programmed for autonomous hazardous area data collection, of claim 11, wherein the GPS-denied drone comprises a first autonomous vehicle, and wherein the base station comprises a second autonomous vehicle.

20. The method of operating the low-cost, GPS-denied drone programmed for autonomous hazardous area data collection, of claim 11, wherein the base station comprises a ground vehicle tethered to a control station.

* * * * *